US011132025B2

(12) United States Patent
Seo et al.

(10) Patent No.: US 11,132,025 B2
(45) Date of Patent: Sep. 28, 2021

(54) APPARATUS INCLUDING MULTIPLE TOUCH SCREENS AND METHOD OF CHANGING SCREENS THEREIN

(71) Applicant: SAMSUNG ELECTRONICS CO., LTD., Suwon-si (KR)

(72) Inventors: Joon-Kyu Seo, Gyeonggi-do (KR); Hyun-Jin Kim, Seoul (KR); Ju-Youn Lee, Gyeonggi-do (KR); Min-Kyu Park, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/294,426

(22) Filed: Mar. 6, 2019

(65) Prior Publication Data

US 2019/0204871 A1 Jul. 4, 2019

Related U.S. Application Data

(63) Continuation of application No. 13/370,985, filed on Feb. 10, 2012, now Pat. No. 10,228,728.

(Continued)

(30) Foreign Application Priority Data

Apr. 29, 2011 (KR) .................. 10-2011-0041102
Aug. 11, 2011 (KR) .................. 10-2011-0080024

(51) Int. Cl.
*G06F 1/16* (2006.01)
*G06F 3/0486* (2013.01)
*G06F 3/0488* (2013.01)

(52) U.S. Cl.
CPC .......... *G06F 1/1647* (2013.01); *G06F 1/1616* (2013.01); *G06F 3/0486* (2013.01); *G06F 3/04883* (2013.01); *G06F 3/04886* (2013.01)

(58) Field of Classification Search
CPC .... G06F 1/1647; G06F 1/1616; G06F 3/0486; G06F 3/04886; G06F 3/04883
See application file for complete search history.

(56) References Cited

U.S. PATENT DOCUMENTS 6,392,877 B1   5/2002   Iredale
6,396,506 B1   5/2002   Hoshino et al.
(Continued)

FOREIGN PATENT DOCUMENTS

CN   1573648 A    2/2005
CN   100407094 C  7/2008
(Continued)

OTHER PUBLICATIONS

Korean Office Action dated Oct. 31, 2018 issued in counterpart application No. 10-2012-0012453, 8 pages.

(Continued)

*Primary Examiner* — Ibrahim A Khan
(74) *Attorney, Agent, or Firm* — Sughrue Mion, PLLC

(57) ABSTRACT

A method of changing screens in an apparatus including multiple touch screens and an apparatus are provided. The method includes displaying a first screen in a first touch screen; displaying a second screen in a second touch screen; detecting multiple touches in the first touch screen; detecting continuous movements of the multiple touches from the first touch screen to the second touch screen; and changing the second screen of the second touch screen in response to the continuous movements of the multiple touches.

13 Claims, 12 Drawing Sheets

Related U.S. Application Data

(60) Provisional application No. 61/441,491, filed on Feb. 10, 2011.

(56) References Cited

U.S. PATENT DOCUMENTS

| | | |
|---|---|---|
| 6,464,195 B1 | 10/2002 | Hildebrandt |
| 6,941,160 B2 | 9/2005 | Otsuka et al. |
| 7,705,833 B2 | 4/2010 | Kim |
| 9,158,494 B2 | 10/2015 | Sirpal et al. |
| 9,489,078 B2 | 11/2016 | Seo et al. |
| 9,489,079 B2 | 11/2016 | Seo et al. |
| 10,055,634 B2* | 8/2018 | Han .................. G06F 3/04883 |
| 10,261,615 B2 | 4/2019 | Lee et al. |
| 10,459,625 B2 | 10/2019 | Seo et al. |
| 10,534,531 B2 | 1/2020 | Seo et al. |
| 10,642,485 B1 | 5/2020 | Seo et al. |
| 2002/0033795 A1 | 3/2002 | Shaholan et al. |
| 2003/0008689 A1 | 1/2003 | Uda |
| 2004/0244146 A1 | 12/2004 | Park |
| 2005/0164745 A1 | 7/2005 | Oe et al. |
| 2006/0073899 A1 | 4/2006 | Kasamatsu et al. |
| 2006/0264243 A1 | 11/2006 | Aarras |
| 2008/0168379 A1 | 7/2008 | Forstall et al. |
| 2008/0244452 A1 | 10/2008 | Kum |
| 2009/0144661 A1 | 6/2009 | Nakajima et al. |
| 2009/0228820 A1 | 9/2009 | Kim et al. |
| 2009/0249235 A1 | 10/2009 | Kim et al. |
| 2010/0060587 A1* | 3/2010 | Freund ............... H04M 1/0247 345/169 |
| 2010/0064536 A1 | 3/2010 | Caskey et al. |
| 2010/0066643 A1 | 3/2010 | King et al. |
| 2010/0085274 A1* | 4/2010 | Kilpatrick, II ...... H04M 1/0247 345/1.3 |
| 2010/0113148 A1* | 5/2010 | Haltovsky ............. A63F 13/235 463/30 |
| 2010/0134039 A1 | 6/2010 | Yu et al. |
| 2010/0134412 A1 | 6/2010 | Narita |
| 2010/0182265 A1* | 7/2010 | Kim .................... G06F 1/1641 345/173 |
| 2010/0188352 A1 | 7/2010 | Ikeda |
| 2010/0245267 A1 | 9/2010 | Min et al. |
| 2010/0245275 A1* | 9/2010 | Tanaka ................ G06F 1/1647 345/173 |
| 2010/0251152 A1 | 9/2010 | Cho et al. |
| 2010/0259494 A1* | 10/2010 | Kii .................... G06F 3/0416 345/173 |
| 2010/0262928 A1 | 10/2010 | Abbott |
| 2010/0281363 A1* | 11/2010 | Inaba ................. G06F 3/0488 715/702 |
| 2010/0295802 A1 | 11/2010 | Lee |
| 2010/0298032 A1 | 11/2010 | Lee et al. |
| 2010/0298033 A1 | 11/2010 | Lee |
| 2010/0299598 A1 | 11/2010 | Shin et al. |
| 2010/0302179 A1 | 12/2010 | Ahn et al. |
| 2010/0309158 A1 | 12/2010 | Iwayama et al. |
| 2010/0328860 A1 | 12/2010 | Kim et al. |
| 2011/0006971 A1* | 1/2011 | Ebey .................... G06F 3/1431 345/1.3 |
| 2011/0016422 A1* | 1/2011 | Miyazawa ............ G06F 3/0488 715/788 |
| 2011/0018821 A1* | 1/2011 | Kii .................... G06F 1/1616 345/173 |
| 2011/0115737 A1* | 5/2011 | Fuyuno ................ G06F 1/1647 345/173 |
| 2011/0141044 A1* | 6/2011 | Suzukawa ............ G06F 3/04817 345/173 |
| 2011/0193805 A1* | 8/2011 | Park .................... G06F 1/1692 345/173 |
| 2011/0246952 A1* | 10/2011 | Tsao .................... G06F 3/04883 715/863 |
| 2011/0291964 A1* | 12/2011 | Chambers ............ G06F 1/1643 345/173 |
| 2012/0001831 A1* | 1/2012 | Smith .................. G06F 1/263 345/1.3 |
| 2012/0083319 A1 | 4/2012 | Sirpal et al. |
| 2012/0084690 A1* | 4/2012 | Sirpal .................. G06F 3/0416 715/769 |
| 2012/0084735 A1* | 4/2012 | Sirpal ................ G06F 3/04842 715/863 |
| 2012/0084736 A1* | 4/2012 | Sirpal .................. G06F 3/0481 715/863 |
| 2012/0084737 A1* | 4/2012 | Gimpl .................. G06F 3/0483 715/863 |
| 2012/0084738 A1* | 4/2012 | Sirpal .................. G06F 3/0483 715/863 |
| 2012/0113458 A1* | 5/2012 | Benedek ............... G06F 3/1204 358/1.15 |
| 2012/0117290 A1* | 5/2012 | Sirpal .................. G06F 3/1423 710/303 |
| 2012/0127109 A1* | 5/2012 | Nishio ................ G06F 3/04886 345/173 |
| 2012/0280929 A1* | 11/2012 | Rimon .................... G06F 3/046 345/173 |
| 2012/0290946 A1* | 11/2012 | Schrock ................ G06F 3/0482 715/752 |
| 2013/0021379 A1* | 1/2013 | Sirpal ................ G06F 3/04842 345/659 |

FOREIGN PATENT DOCUMENTS

| | | |
|---|---|---|
| CN | 101241427 A | 8/2008 |
| CN | 101527745 A | 9/2009 |
| CN | 101697556 A | 4/2010 |
| CN | 101789993 A | 7/2010 |
| CN | 101795322 A | 8/2010 |
| CN | 101833391 | 9/2010 |
| CN | 101853122 | 10/2010 |
| CN | 101853124 A | 10/2010 |
| CN | 101866238 | 10/2010 |
| CN | 101866263 | 10/2010 |
| CN | 101893914 A | 11/2010 |
| CN | 101901071 A | 12/2010 |
| CN | 101938538 A | 1/2011 |
| EP | 1753239 A2 | 2/2007 |
| EP | 2207076 A2 | 7/2010 |
| EP | 2 214 088 | 8/2010 |
| EP | 2254313 A1 | 11/2010 |
| EP | 2254314 A1 | 11/2010 |
| EP | 2309369 A1 | 4/2011 |
| JP | 2003280622 | 10/2003 |
| JP | 2005-115536 A | 4/2005 |
| JP | 2008-141519 A | 6/2008 |
| JP | 2008-541183 A | 11/2008 |
| JP | 2009-124449 A | 6/2009 |
| JP | 2009205675 | 9/2009 |
| JP | 2010-134039 A | 6/2010 |
| JP | 2010-176332 A | 8/2010 |
| JP | 2010-250463 | 11/2010 |
| JP | 2010-250465 | 11/2010 |
| JP | 2010-262330 | 11/2010 |
| JP | 2010-286911 | 12/2010 |
| JP | 2011-022842 | 2/2011 |
| KR | 100229983 | 11/1999 |
| KR | 1020000064572 | 11/2000 |
| KR | 10-2005-0037839 A | 4/2005 |
| KR | 100577394 B1 | 5/2006 |
| KR | 10-2006-0086923 A | 8/2006 |
| KR | 100827115 | 5/2008 |
| KR | 10-0887778 | 3/2009 |
| KR | 10-2009-0102108 A | 9/2009 |
| KR | 10-2010-082451 | 7/2010 |
| KR | 10-2010-0082451 A | 7/2010 |
| KR | 10-2010-0104562 | 9/2010 |
| KR | 20100125935 | 12/2010 |
| KR | 20100128781 | 12/2010 |
| WO | 2010/010835 A1 | 1/2010 |
| WO | WO 2010/028405 | 3/2010 |
| WO | WO 2010/028406 | 3/2010 |

(56) References Cited

FOREIGN PATENT DOCUMENTS

WO          2010114007  A1      10/2010
WO      WO 2011/013400           2/2011

OTHER PUBLICATIONS

Korean Decision of Grant dated Oct. 31, 2018 issued in counterpart application No. 10-2012-0012437, 6 pages.
Korean Office Action dated Nov. 10, 2017 issued in counterpart application No. 10-2012-0012426, 10 pages.
Korean Office Action dated Jun. 28, 2017 issued in counterpart application No. 10-2011-0080024, 15 pages.
Korean Office Action dated Jul. 24, 2018 issued in counterpart application No. 10-2012-0066401, 7 pages.
Chinese Office Action dated Jul. 2, 2015 issued in counterpart application No. 201280008631.7, 16 pages.
Communication dated May 29, 2020 issued by the Korean Intellectual Property Office in counterpart Korean Application No. 10-2019-0071540.
Communication dated Mar. 20, 2018, issued by the Korean Intellectual Property Office in Korean Application No. 10-2011-0062553.
Communication dated Oct. 1, 2020 issued by the European Patent Office in European Application No. 20173893.7.
Communication dated Oct. 1, 2020 issued by the European Patent Office in European Application No. 20173896.0.
Communication dated Oct. 1, 2020 issued by the European Patent Office in European Application No. 20173924.0.
Communication dated Oct. 1, 2020 issued by the European Patent Office in European Application No. 20173932.3.
Communication dated Oct. 1, 2020 issued by the European Patent Office in European Application No. 20173907.5.
Communication dated Oct. 1, 2020 issued by the European Patent Office in European Application No. 20173916.6.
Chinese Patent Office, Communication dated Nov. 11, 2019 by the Chinese Patent Office in Application No. 201610169069.6.
Communication dated Aug. 25, 2016, issued by the European Patent Office in European Application No. 12745181.3.
Communication dated Aug. 31, 2015 issued by the State Intellectual Property Office of P.R. China in Chinese Patent Application No. 201280017792.2.
Communication dated Jul. 29, 2016, issued by the Australian Patent Office in Australian Application No. 2012215303.
Communication dated Mar. 13, 2019, issued by the European Patent Office in European Application No. 12745181.3.
Communication dated May 29, 2020, issued by the Korean Intellectual Property Office in Korean Application No. 10-2019-0071540.
Communication dated May 31, 2018, issued by the State Intellectual Property Office of P.R. China in Chinese Patent Application No. 201610169069.6.
Communication dated Oct. 26, 2018, issued by the State Intellectual Property Office of the People's Republic of China in Chinese Patent Application No. 201610602742.0.
Communication dated Sep. 10, 2018, issued by the State Intellectual Property Office of the People's Republic of China in Chinese Patent Application No. 201610169057.3.
Communication dated Sep. 5, 2019, issued by the Korean Intellectual Property Office in Korean Application No. 10-2019-0071540.
Communication dated Mar. 7, 2016, issued by the Japanese Patent Office in Japanese Patent Application No. 2013-553351.
Communication dated Oct. 1, 2020 by the European Patent Office in European Patent Application No. 20173907.5.
Communication dated Oct. 1, 2020 by the European Patent Office in European Patent Application No. 20173916.6.
Communication dated Oct. 1, 2020 by the European Patent Office in European Patent Application No. 20173924.0.
Communication dated Oct. 1, 2020 by the European Patent Office in European Patent Application No. 20173932.3.
Communication dated Oct. 16, 2019 by the Indian Patent Office in Application No. 7242/CHENP/2013.
Communication dated Aug. 31, 2020 issued by the European Patent Office in European Application No. 20173889.5.
International Search Report (PCT/ISA/210) and Written Opinion (PCT/ISA/237) dated Oct. 4, 2012, issued in International Application No. PCT/KR2012/000888.
Notice of Allowance issued in parent U.S. Appl. No. 14/790,496 dated Dec. 18, 2015.
Notice of Allowance issued in prior U.S. Appl. No. 13/984,805 dated Jun. 26, 2015.
Notice of Allowance issued in prior U.S. Appl. No. 13/984,805 dated Mar. 16, 2015.
Second Notice of Allowance issued in parent U.S. Appl. No. 14/790,496 dated Feb. 26, 2016.
Third Notice of Allowance issued in parent U.S. Appl. No. 14/790,496 dated Jun. 21, 2016.
European Patent Office, Communication dated Mar. 23, 2020 in European Application No. EP 19192184.0.
Youtube, https://www.youtube.com/watch?v=JKXQcChRVGwS, "A Closer Look at the Toshiba Libretto W1000", netbooknews.com, Jul. 9, 2020, 2 pages total.
Communication dated Oct. 31, 2018 by the Korean Patent Office in Korean Application No. 10-2012-0012437.
Communication dated Mar. 20, 2018 by the Korean Patent Office in Korean Application No. 10-2011-0062553.
Communication dated Jul. 15, 2015 by the State Intellectual Property Office of the P.R. Of China Patent Office in Chinese Application No. 201280008631.7.
Communication dated Oct. 31, 2018 by the Korean Patent Office in Korean Application No. 10-2012-0012453.

\* cited by examiner

APPARATUS INCLUDING MULTIPLE TOUCH SCREENS AND METHOD OF CHANGING SCREENS THEREIN

PRIORITY

This application is a Continuation Application of U.S. application Ser. No. 13/370,985, which was filed in the U.S. Patent and Trademark Office on Feb. 10, 2012, which claims priority under 35 U.S.C. § 119(e) to U.S. Provisional Application Ser. No. 61/441,491, which was filed in the U.S. Patent and Trademark Office on Feb. 10, 2011, and under 35 USC § 119(a) to Korean Patent Application Serial No. 10-2011-0041102, which was filed in the Korean Industrial Property Office on Apr. 29, 2011, and Korean Patent Application Serial No. 10-2011-0080024, which was filed in the Korean Industrial Property Office on Aug. 11, 2011, the entire content of each of which is incorporated herein by reference.

BACKGROUND OF THE INVENTION

1. Field of the Invention

The present invention generally relates to an apparatus including multiple touch screens and a method of changing screens in the apparatus.

2. Description of the Related Art

A desktop computer has at least one display device, e.g., a monitor, which may be connected to the desktop computer using a D-subminiature connector or a Digital Visual Interface (DVI) connector. A user may divide a screen of the display device connected to the desktop computer depending on a working environment, for example, the user divides the screen in a widthwise direction or a lengthwise direction and displays multiple windows in the divided screen.

However, a mobile device, e.g. a mobile phone, a smart phone, a tabletop PC, etc. has a single display device, which often uses a touch screen, and has a limitation in a size of a screen and usage of an input device, compared to the desktop computer. Accordingly, the mobile device has difficulty dividing the screen and using applications in divided screens.

SUMMARY OF THE INVENTION

The present invention has been made to address the above-described problems occurring in the prior art, and provide at least the advantages described below.

Accordingly, an aspect of the present invention is to provide an apparatus and method for changing screens, which includes multiple touch screens and changes screens using movements of continuous multiple touches.

Another aspect of the present invention is to provide an apparatus including multiple touch screens, and a method thereof, which provide a user with at least one of a visual feedback, an auditory feedback, and a tactile feedback in response to movements of continuous multiple touches.

Another aspect of the present invention is to provide an apparatus including multiple touch screens, and a method thereof, which change a screen by using a movement of at least one touch.

Another aspect of the present invention is to provide an apparatus including multiple touch screens, and a method thereof, which provide a user with at least one of a visual feedback, an auditory feedback, and a tactile feedback in response to a movement of a continuous touch.

Another aspect of the present invention is to provide an apparatus including multiple touch screens, and a method thereof, which can change a touch gesture corresponding to a screen change.

In accordance with an aspect of the present invention, a method of changing screens in an apparatus including multiple touch screens is provided. The method includes displaying a first screen in a first touch screen; displaying a second screen in a second touch screen; detecting multiple touches in the first touch screen; detecting continuous movements of the multiple touches from the first touch screen to the second touch screen; and changing the second screen of the second touch screen in response to the continuous movements of the multiple touches.

In accordance with another aspect of the present invention, a method of changing screens in an apparatus including multiple touch screens is provided. The method includes displaying a first screen in a first touch screen; displaying a second screen in a second touch screen; detecting multiple touches in the first touch screen; detecting a continuous movement of at least one of the multiple touches from the first touch screen to the second touch screen; and changing the second screen of the second touch screen in response to the movement of the at least one of the multiple touches.

In accordance with another aspect of the present invention, an apparatus is provided. The apparatus includes a first touch screen for displaying a first screen; a second touch screen for displaying a second screen; and a control unit for controlling the second screen of the second touch screen to change, in response to continuous movements of multiple touches detected in the first touch screen, from the first touch screen to the second touch screen.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
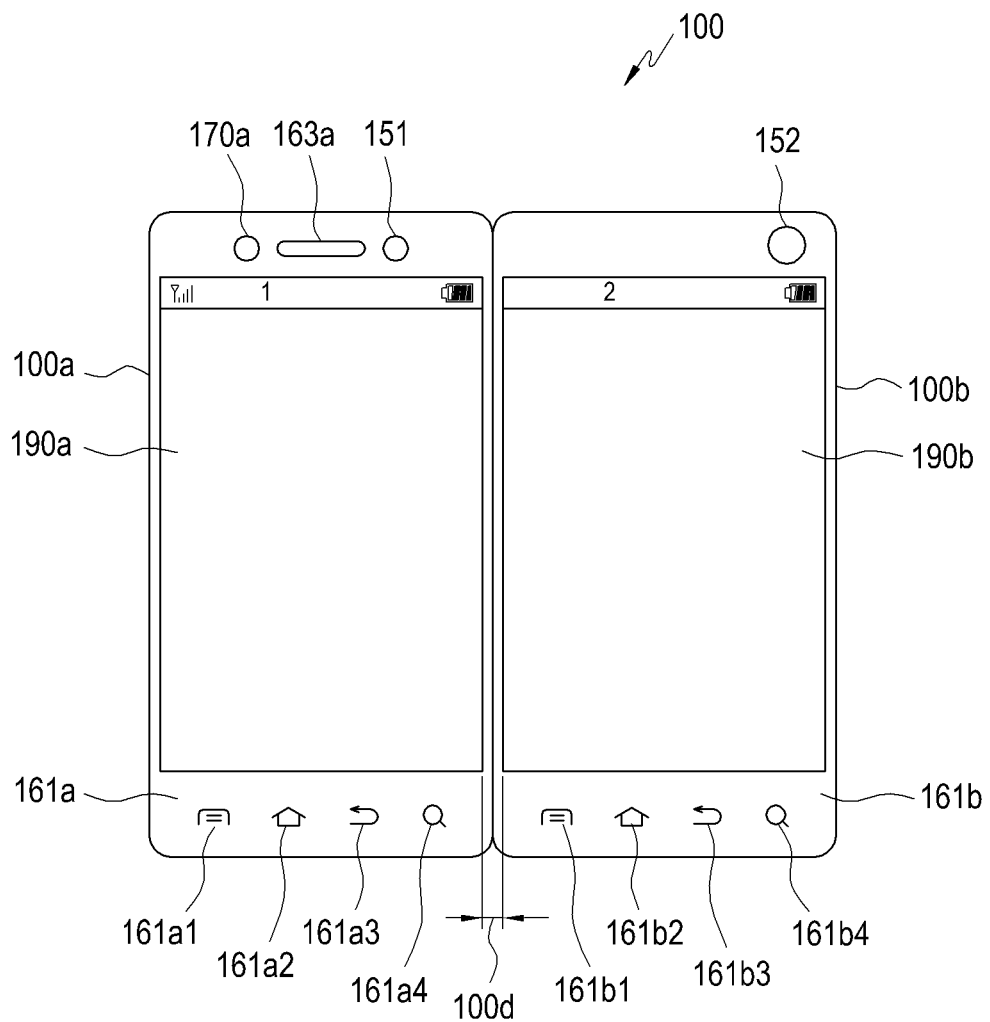
FIG. 1 illustrates an apparatus including multiple touch screens according to an embodiment of the present invention.

FIG. 1 illustrates an apparatus including multiple touch screens according to an embodiment of the present invention.

Referring to FIG. 1, the apparatus 100 includes a first housing 100a, a second housing 100b, and at least one hinge part 100c1, 100c2, or 100c3 (see FIG. 2) for connecting the first housing 100a and the second housing 100b.

The first housing 100a includes a first camera 151 for photographing a still image or a video, a first button group 161a including at least one button, a first sensor 170a for detecting an approach of a user or an object, a first speaker 163a for outputting voice and/or sound to the outside of the apparatus 100, and a first touch screen 190a on a front surface thereof. Further, the first housing 100a includes a power/lock button (not shown), an ear jack (not shown) connected to an earphone or a headphone, at least one volume button (not shown) for controlling a level of voice or sound, a connector 165 (see FIG. 2) for connecting to an external device (not shown) connectable with the apparatus 100 using a cable (e.g., a Universal Serial Bus (USB) cable or a power cable), and a second speaker 163b (see FIG. 2) for outputting voice and sound.

The second housing 100b includes a second camera 152 for photographing a still image or a video, a second button group 161b including at least one button, and a second touch screen 190b on a front surface thereof.

The hinge part 100c1, 100c2, or 100c3 makes the first housing 100a be connected to the second housing 100b. The first housing 100a and the second housing 100b may be rotatable through the hinge part 100c1, 100c2, or 100c3, which will be described in more detail below with reference to FIG. 2.

The constructional elements of the apparatus 100 illustrated in FIG. 1 are merely examples, and other constructional elements may be added or omitted according to a capability of the apparatus 100. Further, the positions of the constructional elements may be changed depending on the capability and the structure of the apparatus 100.

Figure 2A:
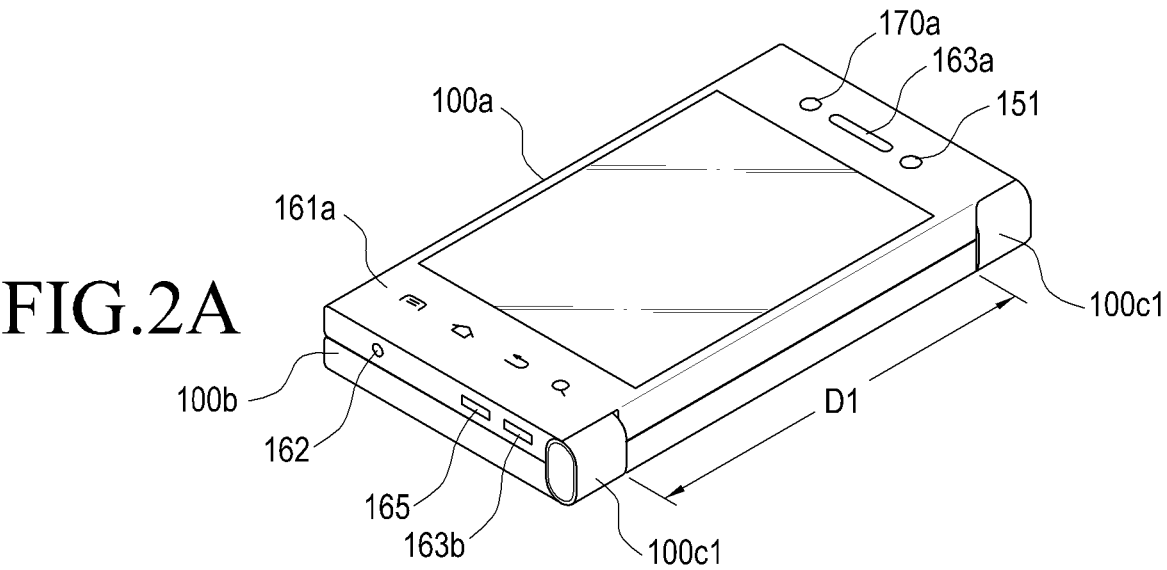
FIGS. 2A to 2C are perspective views illustrating an apparatus including multiple touch screens according to an embodiment of the present invention.
Figure 2B:
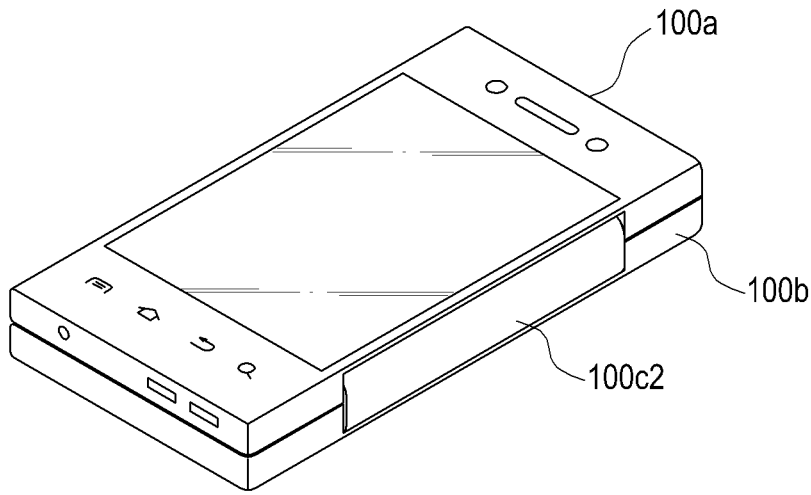
Figure 2C:
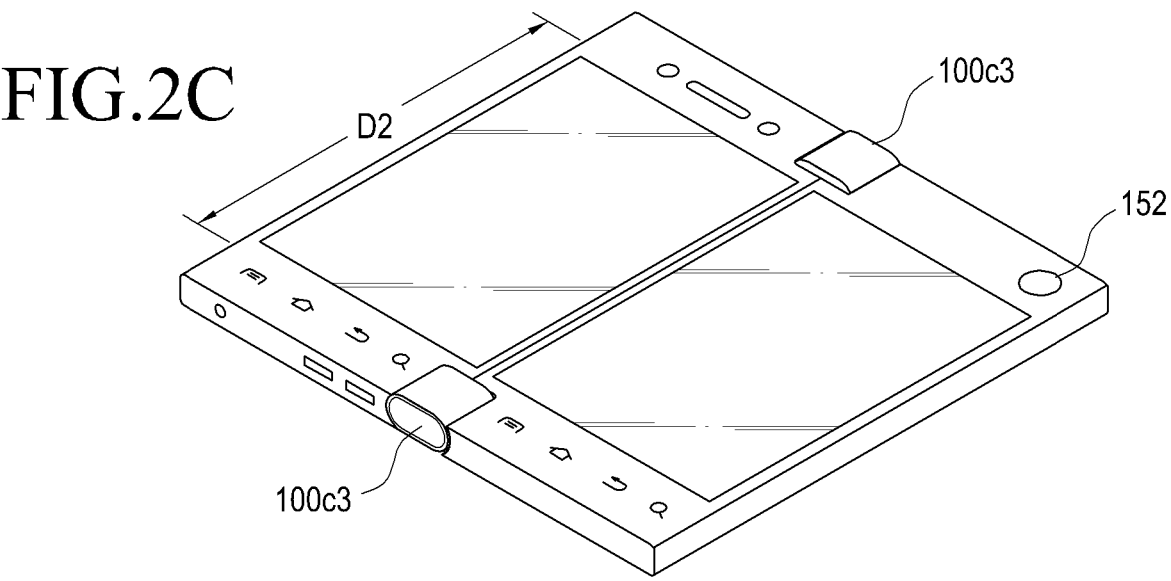

FIGS. 2A to 2C are perspective views illustrating an apparatus including multiple touch screens according to an embodiment of the present invention.

Referring to FIGS. 2A to 2C, the first housing 100a and the second housing 100b of the apparatus 100 are in a closed state. Referring to FIG. 1 and FIG. 2C, the first housing 100a and the second housing 100b of the apparatus 100 are in an opened state.

The hinge part 100c1, 100c2, or 100c3 is positioned between the first housing 100a and the second housing 100b. For example, the first housing 100a and the second housing 100b may move within an angle range of 0° to 220° through the hinge part 100c1, 100c2, or 100c3. Further, first housing 100a and the second housing 100b may be rotated in a unit of 5° from 0° using the hinge part 100c1, 100c2, or 100c3.

Referring to FIG. 2A, in the closed state, an angle between a rear surface of the first housing 100a and a rear surface of the second housing 100b is 0°, e.g., the rear surface of the first housing 100a is parallel to the rear surface of the second housing 100b. The rear surface of the first housing 100a is in contact with the rear surface of the second housing 100b or the rear surface of the first housing 100a is spaced apart from the rear surface of the second housing 100b by a very small distance, e.g., 3 mm or smaller. In the closed state, the angle between the rear surface of the first housing 100a and the rear surface of the second housing 100b may be smaller than 5°.

The first housing 100a includes the power/lock button (not shown), the volume button (not shown), a microphone 162 (hereinafter, referred to as a mic), the connector 165, and the second speaker 163b in the side surface thereof.

The plurality of hinge parts 100c1 are connected to both ends of one surface of the first housing 100a and both ends of one surface of the second housing 100b. The plurality of hinge parts 100c1 are spaced apart from each other by a distance D1.

FIG. 1 illustrates the apparatus 100 opened from the closed state of FIG. 2A. It is noted that in the opened state, as illustrated in FIG. 1, the plurality of hinge parts 100c1 connecting the first housing 100a with the second housing 100b are not exposed to the front surfaces of the first housing 100a and the second housing 100b.

Further, the first touch screen 190a and the second touch screen 190b are disposed in a lengthwise direction such that the first touch screen 190a and the second touch screen 1901) are actually parallel to a virtual line extended from one hinge part 100c1 to another hinge part 100c1.

Alternatively, a length of the first touch screen 190a or a length of the second touch screen 190b may be longer than a distance D1 between one hinge part 100c1 to another hinge part 100c1.

Further, although FIG. 1 illustrates each touch screen 190a and 190b as having a quadrangle shape, the shape and a direction of the disposition of the touch screens 190a and 190b may change.

In the opened state, a space 100d is formed between the first touch screen 190a and the second touch screen 190d. In the closed state, a distance between the first touch screen 190a of the apparatus 100 and an end of the first housing 100a is half of the space 100d.

Referring to FIG. 2B, the apparatus 100 includes the first housing 100a, the second housing 100b, and the single hinge part 100c2. Specifically, the hinge part 100c2 is located at a center portion of a side surface of the first housing 100a be connected with a center portion of a side surface of the second housing 100b.

FIG. 1 may also illustrate the apparatus 100 of FIG. 2B in the opened state. Again, referring to FIG. 1, the single hinge part 100c2 connecting the first housing 100a and the second housing 100b is not exposed to the front surface of the first housing 100a and the front surface of the second housing 100b.

Referring to FIG. 2C, the apparatus 100 includes the first housing 100a, the second housing 100b, and the plurality of hinge parts 100c3. However, differently from FIG. 1, the plurality of hinge parts 100c3, which connect the first housing 100a and the second housing 100b, are exposed to the front surface of the first housing 100a and the front surface of the second housing 100b when in the opened state.

The hinge parts 100c1 and 100c3 may be biaxial hinge parts (not shown) which use a first hinge axis (not shown) corresponding to the first housing 100a and a second hinge axis (not shown) corresponding to the second housing 100b to rotate the first housing 100a or the second housing 100b. The hinge part 100c2 may be a uniaxial hinge part (not shown), which provides a first hinge axis (not shown) and is formed in an end of the first housing 100a and an end of the second housing 100b, to rotate the first housing 100a or the second housing 100b.

Figure 3:
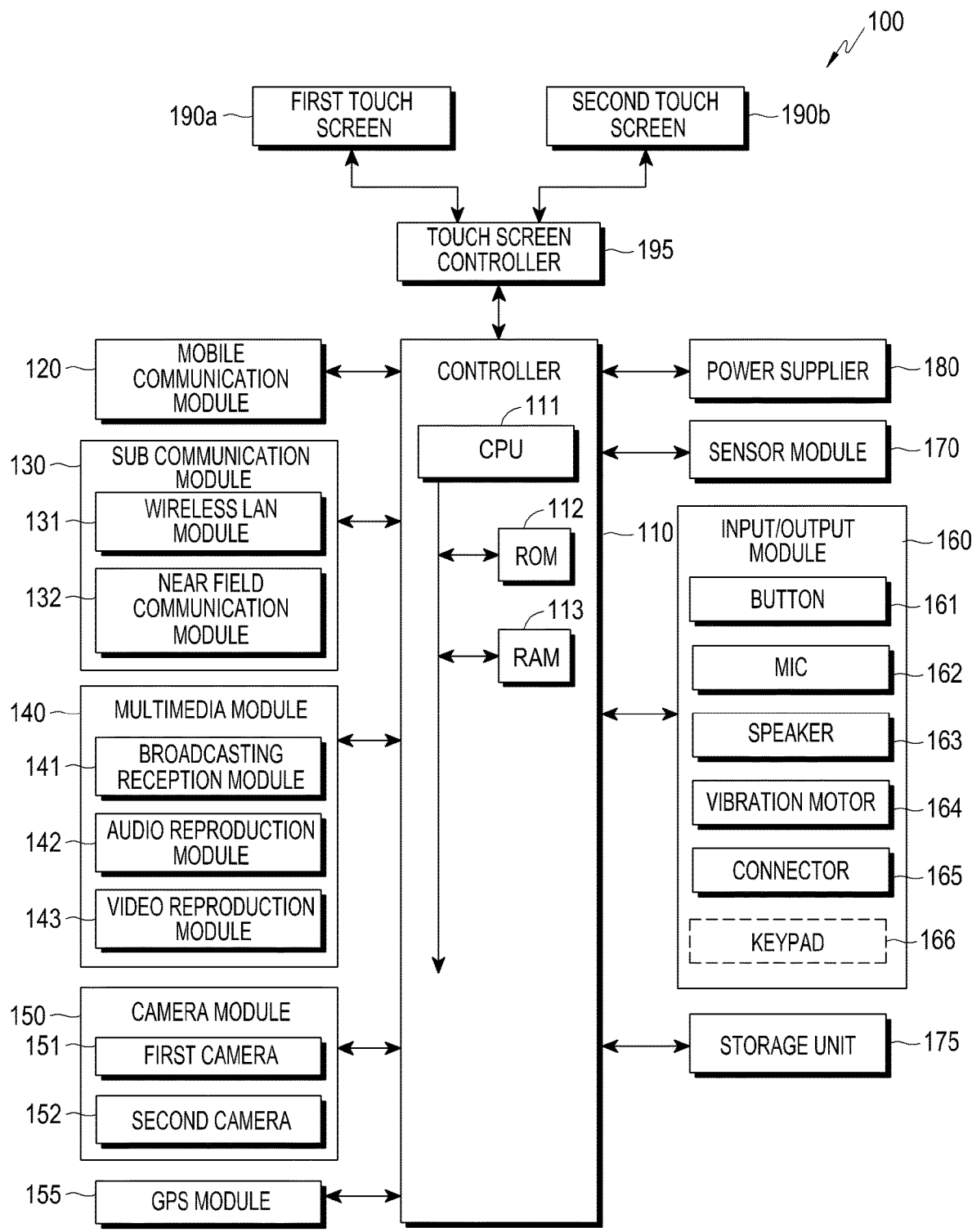
FIG. 3 is a block diagram illustrating an apparatus including multiple touch screens according to an embodiment of the present invention.

FIG. 3 is a block diagram illustrating an apparatus including multiple touch screens according to an embodiment of the present invention.

Referring to FIG. 3, the apparatus 100 may be connected to an external device by using a mobile communication module 120, a sub communication module 130, and the connector 165. The "external device" includes another device, a mobile phone, a smart phone, a computer, a server, etc.

Referring to FIG. 3, the apparatus 100 includes a controller 110, a touch screen controller 195, the mobile communication module 120, the sub communication module 130, a multimedia module 140, a camera module 150, a Global Positioning System (GPS) module, an input/output module 160, a sensor module 170, a storage unit 175, a power supplier 180, the first touch screen 190a, and the second touch screen 190b.

The sub communication module 130 includes a wireless Local Area Network (LAN) module 131 and a near field communication module 132. The multimedia module 140 includes a broadcasting communication module 141, an audio reproduction module 142, and a video reproduction module 143. The camera module 150 includes a first camera 151 and a second camera 152. The input/output module 160 includes a button 161, the microphone (mic) 162, the speaker 163, a vibration motor 164, a connector 165, and a keypad 166.

The controller 110 includes a Central Processing Unit (CPU) 111, a Read Only Memory (ROM) 112 that stores a control program for controlling the apparatus 100, and a Random-Access Memory (RAM) 113. The CPU 111 may include a single core, dual cores, triple cores, or quad cores. Further, the CPU 111, the ROM 112, and the RAM 113 are connected through an internal bus.

The controller 110 controls the touch screen controller 195, the mobile communication module 120, the sub communication module 130, the multimedia module 140, the camera module 150, the GPS module 155, the input/output module 160, the sensor module 170, the storage unit 175, the power supplier 180, the first touch screen 190a, and the second touch screen 190b.

The mobile communication module 120 connects the apparatus 100 to the external device through the mobile communication via at least one antenna (not shown) under the control of the controller 110. The mobile communication module 120 transmits and receives wireless signals for voice communication, video communication, a Short Message Service (SMS), or a Multimedia Message Service (MMS).

The sub communication module 130 includes the wireless LAN module 131 and the near field communication module 132. Alternatively, the sub communication module 130 may include the wireless LAN module 131 or the near field communication module 132.

The wireless LAN module 131 connects to the Internet at a wireless Access Point (AP) under the control of the controller 110. For example, the wireless LAN module 131 may support the wireless LAN standard of the Institute of Electrical and Electronics Engineers (IEEE) 802.11x.

The near field communication module 132 performs a wireless near field communication between the apparatus 100 and an external device, such as a printer or headphones, under the control of the controller 110. For example, the near field communication scheme may include a Bluetooth communication, an Infrared Data Association (IrDA), etc.

Alternatively, the apparatus 100 may include the mobile communication module 120, the wireless LAN module 131, or the near field communication module 132.

The multimedia module 140 includes the broadcasting communication module 141, the audio reproduction module 142, and the video reproduction module 143. The broadcasting communication module 141 receives a broadcast signal, e.g., a Television (TV) broadcast, a radio broadcast, or a data broadcast signal, and additional broadcasting information, e.g., Electric Program Guide (EPS) or Electric Service Guide (ESG), output from a broadcasting station via a broadcasting communication antenna.

The audio reproduction module 142 reproduces a stored or received digital audio file, under the control of the controller 110. Likewise, the video reproduction module 143 reproduces a stored or received digital video file, under the control of the controller 110. The video reproduction module 143 may also reproduce a digital audio file.

Alternatively, the multimedia module 140 may include one of the audio reproduction module 142 and the video reproduction module 143.

Further, in another alternative embodiment, the audio reproduction module 142 and the video reproduction module 143 of the multimedia module 140 may be included in the controller 100.

The camera module 150 includes the first camera 151 of the first housing 100a and the second camera 152 of the second housing 100b for photographing a still image or a video under the control of the controller 110. Alternatively, the camera module 150 may include only the first camera 151 or only the second camera 152.

The GPS module 155 calculates a position of the apparatus 100 based on signals from GPS satellites.

The input/output module 160 includes buttons 161, the microphone 162, the speaker 163, the vibration motor 164, the connector 165, and the keypad 166. For example, the buttons 161 include a first button group 161a of the first housing 100a, a second button group 161b of the second housing 100b, the power/lock button in the side surface of the first housing 100a or the second housing 100b, and a volume button.

Referring to FIG. 1, the first button group 161a is formed in the front surface of the first housing 100a, and includes a menu button 161a1, a home button 161a2, a back button 161a3, and a search button 161a4. The second button group 161b is formed in the front surface of the second housing 100b, and includes a menu button 161b1, a home button 161b2, a back button 161b3, and a search button 161b4.

The mic 162 receives an input of voice or sound and generates an electrical signal under the control of the controller 110. At least one mic 162 may be formed in the first housing 100a and the second housing 100b.

The speaker 163 outputs sounds of the mobile communication module 120, the sub communication module 130, the multimedia module 140, and the camera module 150.

According to an embodiment of the present invention, the speaker 163 outputs sound in response to a movement of continuous multiple touches from the first touch screen 190a to the second touch screen 190b. Further, the speaker 163 may output sound in response to a movement of continuous multiple touches from the second touch screen 190b to the first touch screen 190a.

According to another embodiment of the present invention, the speaker 163 outputs sound in response to a movement of a continuous single touch from the first touch screen 190a to the second touch screen 190b or a movement of a continuous single touch from the second touch screen 190b to the first touch screen 190a.

The vibration motor 164 converts an electrical signal to mechanical vibration under the control of the controller 110.

According to an embodiment of the present invention, the vibration motor 164 operates in response to movements of continuous multiple touches from a first touch screen 190a to the second touch screen 190b or in response to movements of continuous multiple touches from the second touch screen 190b to the first touch screen 190a.

According to another embodiment of the present invention, the vibration motor 164 operates in response to a movement of a continuous single touch from the first touch screen 190a to the second touch screen 190b or in response to a movement of a continuous single touch from the second touch screen 190b to the first touch screen 190a.

The connector 165 is an interface for connecting the apparatus 100 with an external device or a power source. Further, data stored in the storage unit 175 of the apparatus 100 may be transmitted to an external device or data may be received from an external device through the connector 165 under the control of the control unit 110.

The keypad 166 receives a key input from a user. The keypad 166 includes a physical keypad formed in the apparatus 100 and/or a virtual keypad that is displayed in the first and second touch screens 190a and 190b. The physical keypad may be excluded depending on a capability of the apparatus 100.

The sensor module 170 includes a sensor for detecting a state of the apparatus 100, and generates a signal responding to the detection and transmits the generated signal to the control unit 110. For example, the sensor module 170 may include an illumination sensor 170a for detecting a quantity of surrounding light, an angle sensor for detecting an angle between the first housing 100a and the second housing 100b, a proximity sensor for detecting a proximity of the apparatus 100 to the user, or a motion sensor for detecting motion, e.g., rotation and acceleration, of the apparatus 100. The sensor included in the sensor module 170 may be added or removed depending on the capability of the apparatus 100.

The storage unit 175 stores a signal or data input/output in response to the operation of the mobile communication module 120, the sub communication module 130, the multimedia module 140, the camera module 150, the GPS module 155, the input/output module 160, the sensor module 170, the first touch screen 190a, and the second touch screen 190b. Further, the storage unit 175 stores a control program for controlling the apparatus 100. The term "storage unit" herein includes the storage unit 175, the ROM 112 in the controller 110, the RAM 113, or the memory card (not shown, e.g. an SD card and a memory stick). The storage unit may include a non-volatile memory, a volatile memory, a Hard Disk Drive (HDD), or a Solid State Drive (SSD).

The power supplier 180 supplies power to the apparatus 100 from a battery or an external power source through the connector 165.

The first and second touch screens 190a and 190b provide the user with the screens corresponding to various services, e.g., a communication, data transmission, broadcasting, and photographing. The first and second touch screens 190a and 190b receive touch inputs through a body of the user, e.g., fingers, or a touching tool, e.g., a stylus pen.

Further, the first and second touch screens 190a and 190b receive an input of a movement of a continuous touch. An analog signal corresponding to the touch input in the first and second touch screens 190a and 190b may be transmitted to the touch screen controllers 195, 195a, and 195b. The touch may include not only the contact with the body of the user or the touching tool, but also the non-contact, e.g., a distance of 1 mm between the first and second touch screens 190a and 190b and the body of the user.

The first and second touch screens 190a and 190b may be implemented by a resistive scheme, a capacitive scheme, an infrared scheme, or an acoustic wave scheme. Further, the first and second touch screens 190a and 190b may be implemented by other schemes to be developed or commercialized.

The touch screen controller 195 converts the analog signal received from the first and second touch screens 190a and 190b to a digital signal, e.g., coordinates (x, y), and transmits the converted digital signal to the controller 110. Alternatively, the touch screen controller 195 may be included in the control unit 110.

The control unit 110 controls the first and second touch screens 190a and 190b using the digital signal received from the touch screen controller 195. For example, the controller 110 may allow an icon displayed in the first and second touch screens 190a and 190b to be selected in response to the touch or execute an operation corresponding to the touch.

Figure 4:
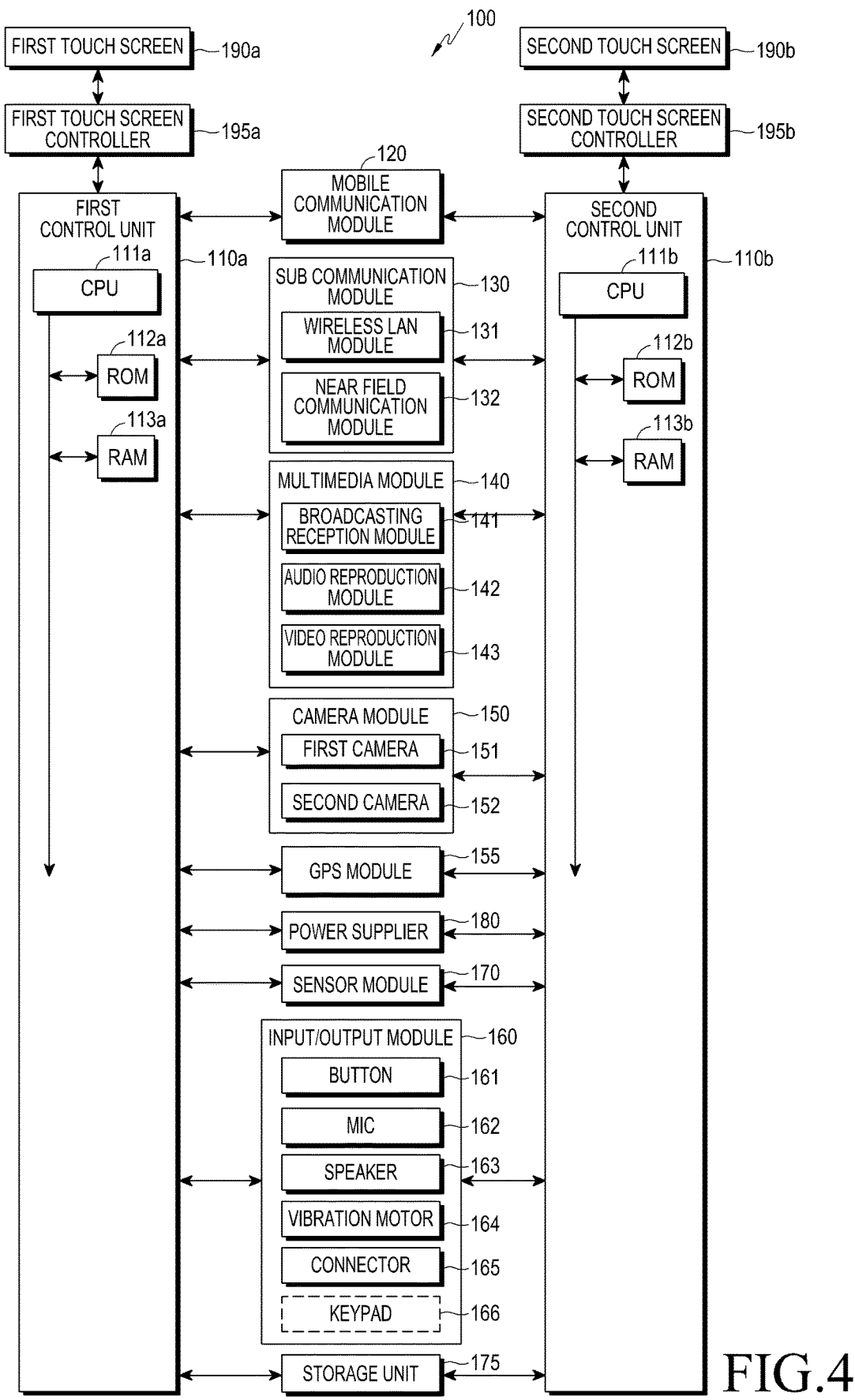
FIG. 4 is a block diagram illustrating an apparatus including multiple touch screens according to another embodiment of the present invention.

FIG. 4 is a block diagram illustrating an apparatus including multiple touch screens according to another embodiment of the present invention. Because the apparatus illustrated in FIG. 4 includes the same components as illustrated in FIG. 3 and described above, except for a first control unit 110a, a second control unit 110b, a first touch screen controller 195a, and a second touch screen controller 195b, repetitive descriptions of the same components will be omitted.

Referring to FIG. 4, the first control unit 110a include a CPU 111a, a ROM 112a, and a RAM 113a. The first control unit 110a controls the first touch screen 190a, a first touch screen controller 195a, the mobile communication module 120, the sub communication module 130, the multimedia module 140, the camera module 150, the GPS module 155, the input/output module 160, the sensor module 170, the storage unit 175, and the power supplier 180.

The first touch screen controller 195a converts an analog signal received from the first touch screen 190a to a digital signal, e.g., coordinates (x, y), and transmits the converted digital signal to the first control unit 110a. Further, the first touch screen controller 195a may be included in the first control unit 110a. The first control unit 110a may control the first touch screen 190a using the digital signal received from the first touch screen controller 195a.

The second control unit 110b includes a CPU 111b, a ROM 112b, and a RAM 113b. The second control unit 110b controls the first touch screen 190*b*, a first touch screen controller 195*b*, the mobile communication module 120, the sub communication module 130, the multimedia module 140, the camera module 150, the GPS module 155, the input/output module 160, the sensor module 170, the storage unit 175, and the power supplier 180.

The second touch screen controller 195*b* converts an analog signal received from the second touch screen 190*b* to a digital signal, e.g., coordinates (x, y), and transmits the converted digital signal to the second control unit 110*b*. Further, the second touch screen controller 195*b* may be included in the second control unit 110*b*. The second control unit 110*b* may control the second touch screen 190*b* using the digital signal received from the second touch screen controller 195*b*.

The first control unit 110*a* controls at least one element, e.g., the first touch screen 190*a*, the first touch screen controller 195*a*, the mobile communication module 120, the sub communication module 130, the multimedia module 140, the camera module 150, the GPS module 155, a first button group 161*a*, the power/lock button, a volume button, the sensor module 170, the storage unit 175, and the power supplier 180, of the first housing 100*a* in which the first control unit 110*a* is disposed.

The second control unit 110*b* controls at least one element, e.g., the second touch screen 190*b*, the second touch screen controller 195*b*, the second camera 152, a second button group 160*b*, the storage unit 175, and the power supplier 180, of the second housing 100*b* in which the second control unit 110*b* is disposed.

Further, the first control unit 110*a* controls the mobile communication module 120, the sub communication module 130, and the input/output module 160 in a unit of a module, and the second control unit 110*b* controls the multimedia module 140, the camera module 150, the GPS module 155, and the sensor module 170 in a unit of a module.

Further, the first control unit 110*a* and the second control unit 110*b* may control the elements of the apparatus 100 according to a priority. For example, the first control unit 110*a* preferentially controls the mobile communication module 120 and the second control unit 110*b* preferentially controls the multimedia module 140.

Figure 11A:
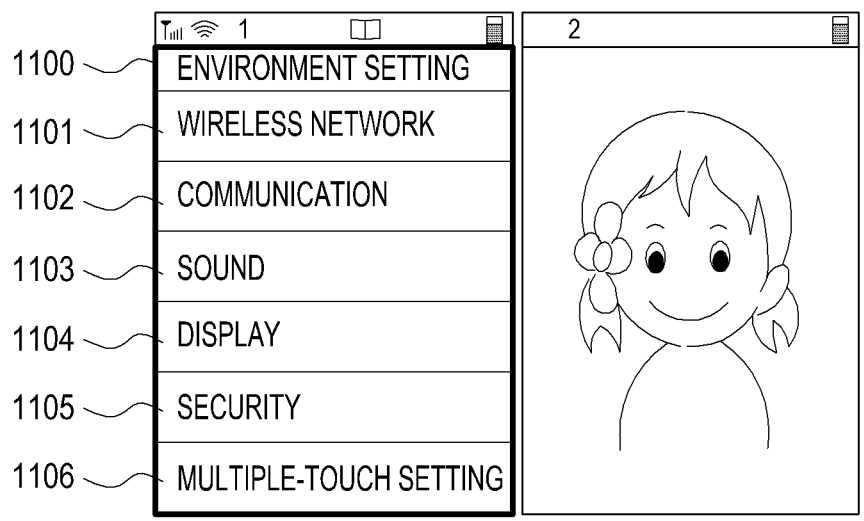
FIGS. 11A and 11B are screen images illustrating an example of a touch setting according to an embodiment of the present invention.

Referring to FIG. 11A, the priority of the elements of the apparatus 100 may be changed using a priority setting of an environment setting 1100.

Figure 5:
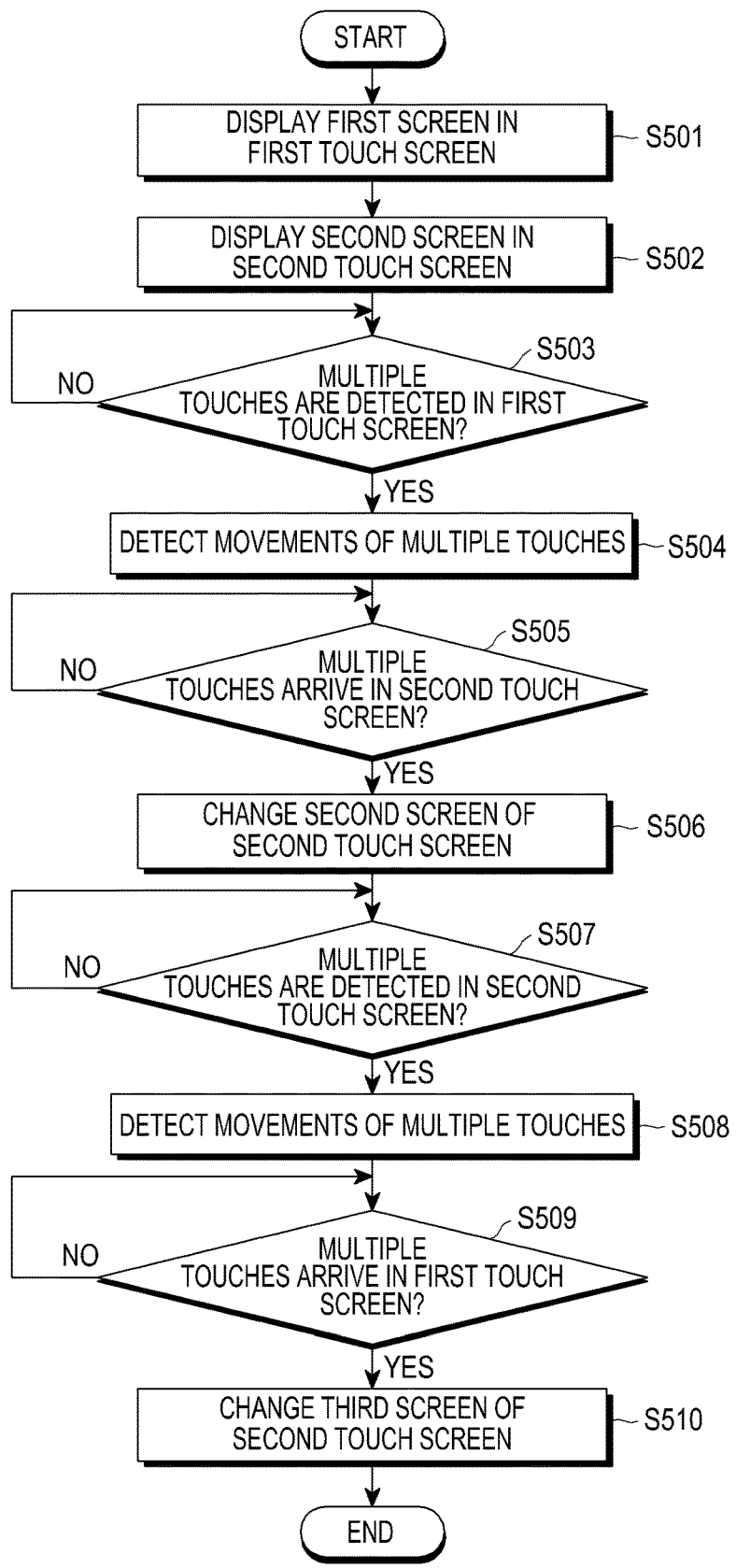
FIG. 5 is a flowchart illustrating a method of changing screens of an apparatus including multiple touch screens according to an embodiment of the present invention.

FIG. 5 is a flowchart illustrating a method of changing screens of an apparatus including multiple touch screens according to an embodiment of the present invention. Further, FIGS. 8A and 8B are screen images illustrating a method of changing screens of an apparatus including multiple touch screens according to an embodiment of the present invention.

Referring to FIG. 5, in step S501 of FIG. 5, a first screen is displayed in a first touch screen.

Figure 8A:
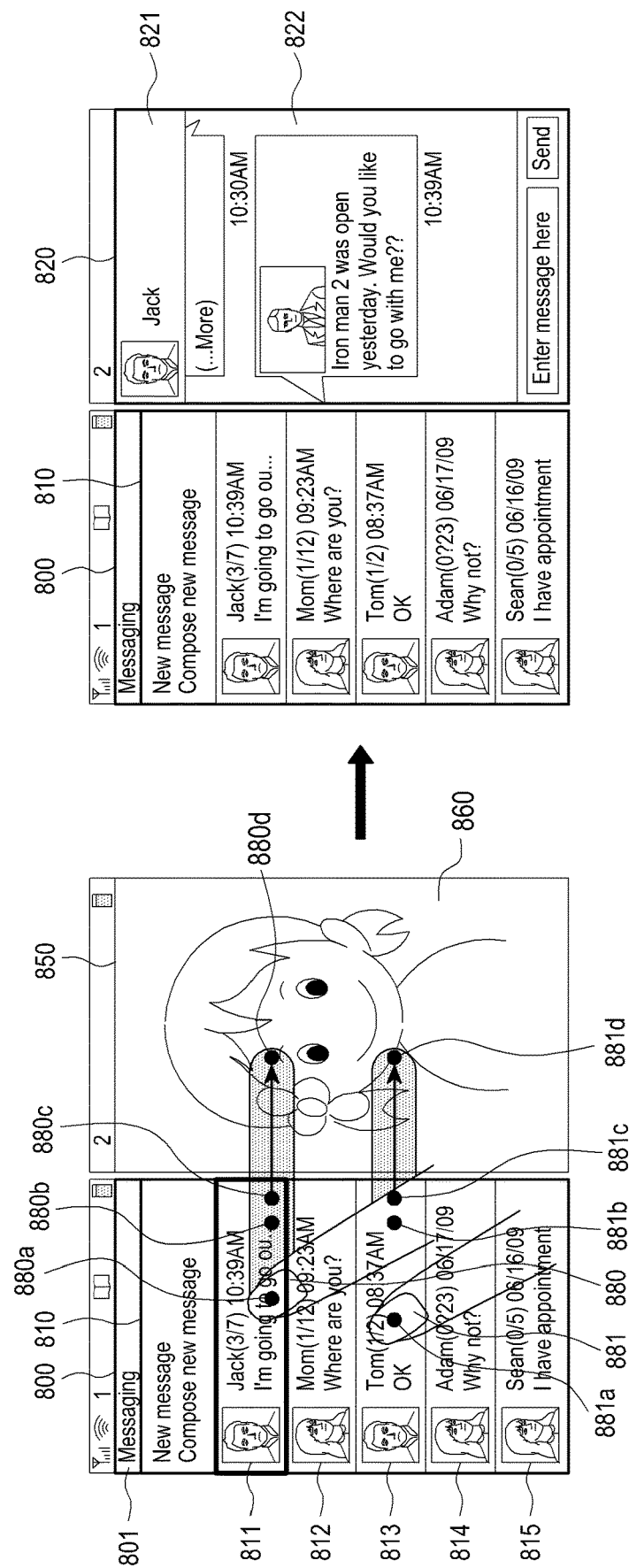
FIGS. 8A and 8B are screen images illustrating a method of changing screens of an apparatus including multiple touch screens according to an embodiment of the present invention.
Figure 8B:
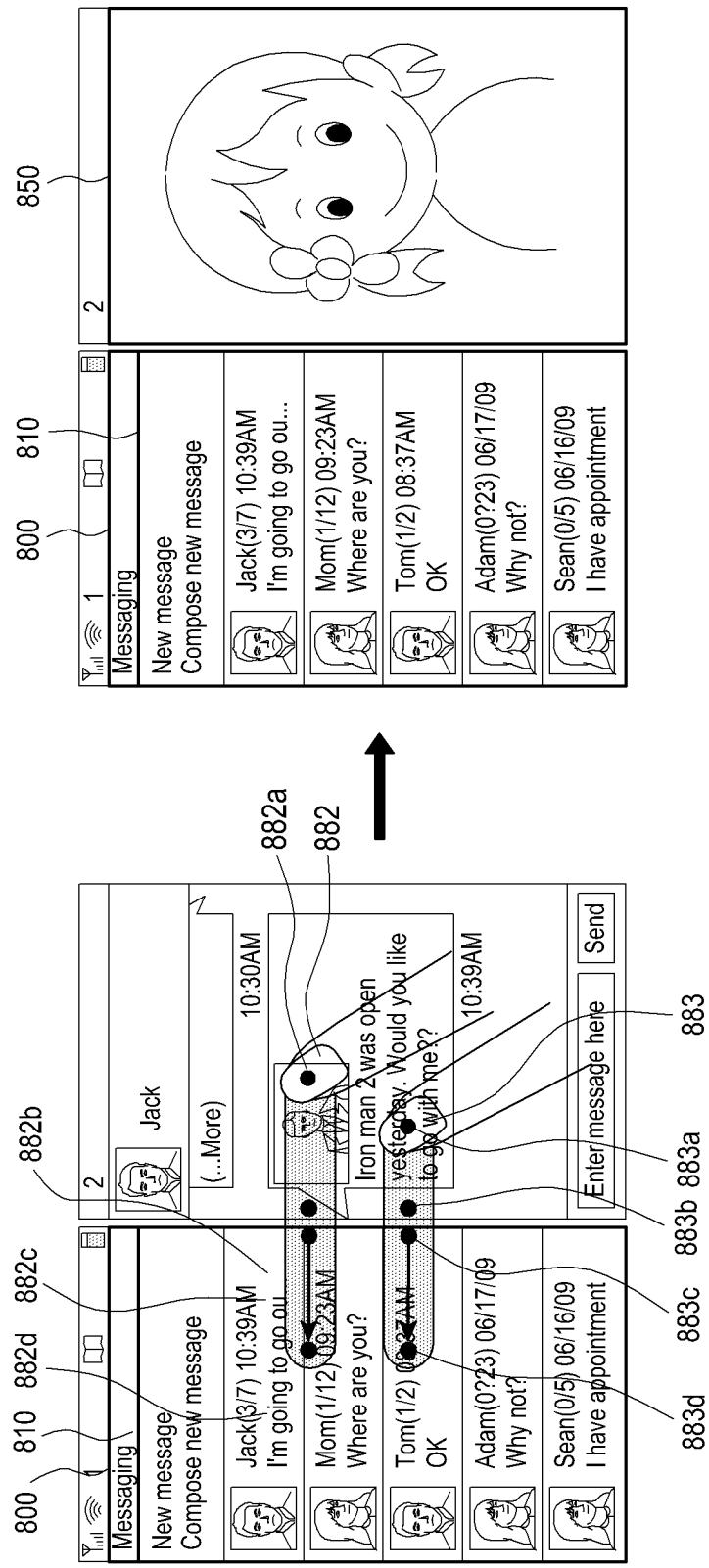

Specifically, referring to FIG. 8A, a first screen 800 is displayed in the first touch screen 190*a*. The first screen 800 includes a title bar 801 displaying a name of a messenger application and a friend list screen 810. Registered friends 811 to 815 are separately displayed in the friend list screen 810. Each of the displayed friends 811 to 815 may include a name, a picture, a number of messages, a time of message receipt, and/or a part of a message.

In step S502 of FIG. 5, a second screen is displayed in a second touch screen.

More specifically, referring to FIG. 8A, a second screen 850 is displayed in the second touch screen 190*b*. The second screen 850 a photo screen 860. The photo screen 860 may display multiple photos.

As illustrated in FIG. 8A, the first screen 800 and the second screen 850 are screens corresponding to separate applications executed in the apparatus 100.

In step S503 of FIG. 5, multiple touches are detected in the first touch screen.

More specifically, referring to FIG. 8A, a user inputs multiple touches 880 and 881 in the first touch screen 190*a* of the apparatus 100. The controller 110 detects the multiple touches 880 and 881 using the first touch screen 190*a* and the touch screen controller 195, or the first control unit 110*a* detects the multiple touches 880 and 881 using the first touch screen 190*a* and the first touch screen controller 195*a*. The controller 110 or the first control unit 110*a* may detect the multiple touches 880 and 881 based on a first time interval between the time of a first touch and the time of a later touch. For example, when the interval between a first and second touch is 1 second or less, the controller 110 or the first control unit 110*a* determine that the input touches are multiple touches. However, the controller 110 or the first control unit 110*a* determines that the input touches are not multiple touches, e.g., when the time interval between the multiple touches exceeds 1 second or a single touch is detected.

The controller 110 or the first control unit 110*a* receives the positions 880*a* and 881*a*, e.g., coordinates (x, y), on the first screen 800 corresponding to the multiple touches 880 and 881 from the touch screen controllers 195 or 195*a*, respectively.

Referring to FIG. 8A, the positions on the first screen 800 corresponding to the multiple touches 880 and 881 are in the friend list screen 810. The friend corresponding to the position of the touch 880 is identified, according to the setting of the apparatus 100, e.g. an order of the multiple touches, and displayed. The setting of the apparatus 100 may include the positions of the multiple touches, e.g., whether a selectable region exists or a lower level exists in a hierarchy structure. Further, when the apparatus 100 does not have the setting corresponding to the multiple touches, the controller 110 or the first control unit 110*a* detects only the multiple touches. Differently from FIG. 8A, the regions corresponding to the positions of the multiple detected touches are displayed without discrimination.

In step S504 of FIG. 5, movements of the multiple touches in the first touch screen are detected.

Referring to FIG. 8A, the multiple touches 880 and 881 are drag & drop gestures or flick gestures in a direction of the second touch screen 190*b*. More specifically, the controller 110 or the first control unit 110*a* detects continuous movements of the multiple touches 880 and 881 contacting the first touch screen 190 by using the first touch screen 190*a* and the touch screen controllers 195 and 195*a*, respectively. The continuous movements of the multiple touches 880 and 881, e.g., movements from the positions 880*a* and 881*a* to the positions 880*b* and 881*b*, mean a part of continuous touch gestures, e.g., movements from the positions 880*a* and 881*a* to the positions 880*d* and 881*d*, of the multiple touches 880 and 881 in the first touch screen 190*a*. Further, the continuous movements of the multiple touches 880 and 881, e.g., movements from the positions 880*c* and 881*c* to the positions 880*d* and 881*d*, mean a part of continuous touch gestures, e.g., movements from the positions 880*a* and 881*a* to the positions 880*d* and 881*d*, of the multiple touches 880 and 881 on the second touch screen 190*b*.

The continuous movements of the multiple touches mean that the contacts are continuously maintained on the first touch screen 190a and the second touch screen 190b, except for the space 100d through which the multiple touches 880 and 881 pass. The continuous movements of the multiple touches are separated in the space 100d and the contacts of the continuous movements of the multiple touches maintained from the initial positions 880c and 881c on the space 100d and the second touch screen 190b are separated at the last positions 880d and 881d. Further, the continuous movements of the multiple touches mean a continuous movement of at least one touch of the multiple touches after the multiple touches 880 and 881 are input, e.g. a movement of the single touch from a position 880a to a position 880d, a movement of another single touch from a position 881a to 881b, or movements of the multiple touches from positions 880a and 881a to the positions 880b and 881b.

In step S505 of FIG. 5, the arrivals of the multiple touches to the second touch screen are detected.

Referring to FIG. 8A, the multiple touches 880 and 881 begin in the first touch screen 190a and pass through the space 100d between the first touch screen 190a and the second touch screen 190b to arrive the second touch screen 190b.

The controller 110, or the first control unit 110a and the second control unit 110b detects the continuous movement of the multiple touches 880 and 881, e.g., the movements from the initial positions 880a and 881a to the last positions 880d and 881d, by using the first and second touch screens 190a and 190b and the touch screen controllers 195, 195a, and 195b. The controller 110, or the first control unit 110a and the second control unit 110b may recognize last positions 880b and 881b in the first touch screen 190a of the multiple touches 880 and 881 and initial positions 880c and 881c of the arrival of the multiple touches 880 and 881 in the second touch screen 190b.

The controller 110, or the first control unit 110a and the second control unit 110b detects the arrivals of the multiple touches 880 and 881 to the second touch screen 190b based on a second time interval, e.g., a time for passing the space 100d, a determined area, or a direction, e.g., a range of an allowable gradient.

Figure 10A:
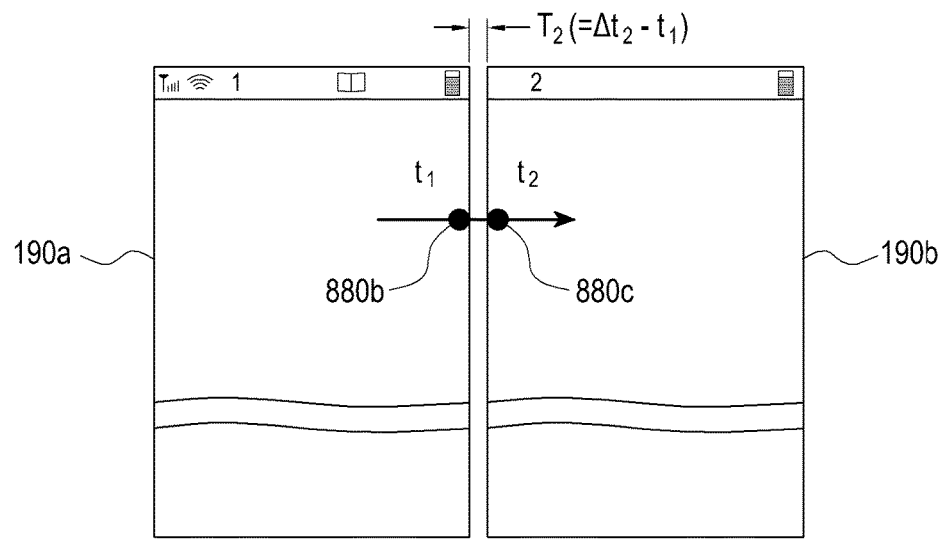
FIGS. 10A and 10C are screen images illustrating an example of an arrival of a continuous touch according to an embodiment of the present invention.
Figure 10B:
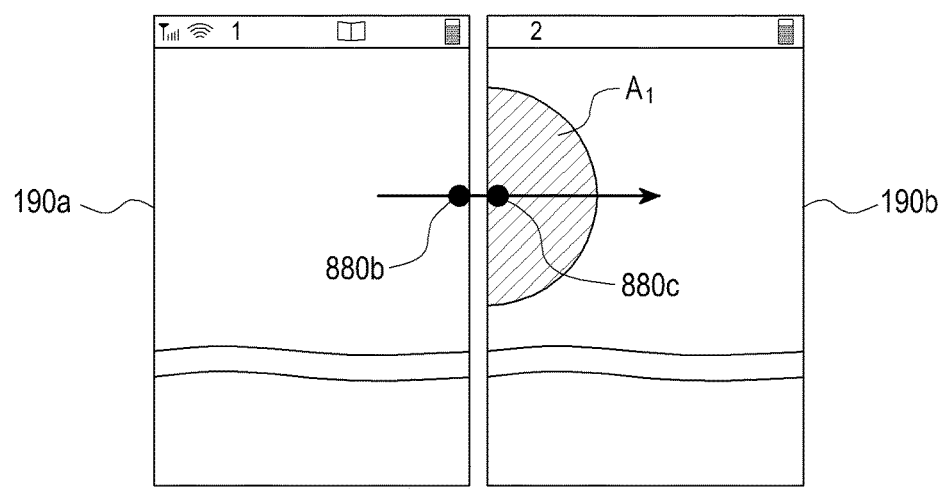
Figure 10C:
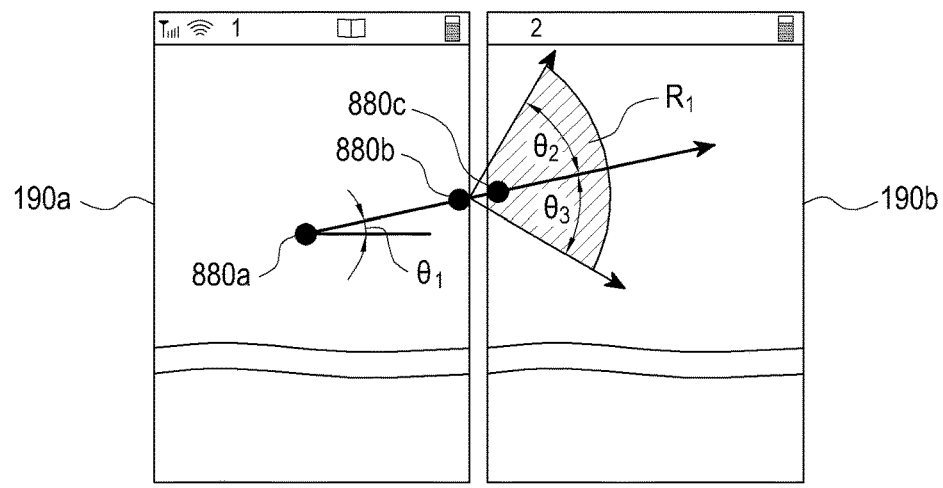

FIGS. 10A and 10C are screen images illustrating an example of an arrival of a continuous touch according to an embodiment of the present invention.

Referring to FIGS. 10A and 10C, the arrivals of the multiple touches 880 and 881 within a second time interval $T_2$, e.g., 0.5 sec, may be detected using a time between a time $t_1$ at the last positions 880b and 881b in the first touch screen 190a and a time $t_2$ of the initial positions 880c and 881c in the second touch screen 190b, the arrivals of the multiple touches 880 and 881 in a determined area $A_1$ including the initial positions 880c and 881c in the second touch screen 190b from the last positions 880b and 881b in the first touch screen 190a may be detected, or the arrivals of the multiple touches 880 and 881 in an area within an allowable gradient range $R_1$ including the initial positions 880c and 881c in the second touch screen 190b, based on a gradient $\theta_1$ from the initial positions 880a and 881a to the last positions 880b and 881b of the multiple continuous touches 880 and 881 in the first touch screen 190a may be detected.

Figure 11B:
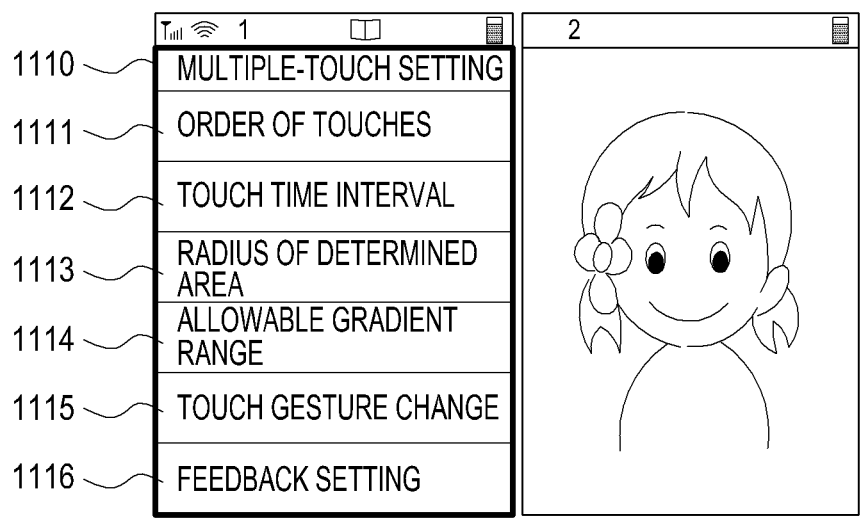

Referring to FIG. 11B, the second time interval $T_2$ may be changed using a time interval 1112 of the multiple-touch setting 1110.

Referring to FIG. 10B, the determined area $A_1$ is a radius of 3 cm based on the positions in the second touch screen 190b extended from the last positions 880b and 881b in the first touch screen 190a. Further, the determined area may have a polygonal shape, e.g., a polygon having 3 cm in width and 6 cm in length. The determined areas of the respective touches 880 and 881 may be overlaid.

Referring to FIG. 11B, the determined area $A_1$ may be changed using a radius 1113 of the determined area of the multiple-touch setting 1110.

Referring to FIG. 10C, the allowable gradient range $R_1$ means second gradients $\theta_2$ and $\theta_3$, e.g., a range of ±45°. For example, when an angle of the first gradient $\theta_1$, i.e., a gradient of a straight line from the initial positions 880a and 881a in the first touch screen 190a to the last positions 880b and 881b, of the multiple continuous touches 880 and 881 is 15°, the initial positions 880c and 881c in the second touch screen 190b are within an area in which the angles of the second gradients $\theta_2$ and $\theta_3$, i.e., the gradients between the last positions 880b and 881b in the first touch screen 190a and the initial positions in the second touch screen 190b, ranges from 60° to −30°. The allowable gradient ranges of the respective touches 880 and 881 may be overlaid.

Referring to FIG. 11B, the allowable gradient range $R_1$ may be changed using an allowable gradient range 1114 of the multiple-touch setting 1110.

The controller 110, or the first control unit 110a and the second control unit 110b may provide the user with feedback in response to the arrivals of the multiple touches 880 and 881 at the positions 880c and 881c in the second touch screen 190b. Additionally, a visual feedback, an auditory feedback, and/or a tactile feedback may be provided.

For example, the visual feedback may be displayed in the first touch screen 190a or the second touch screen 190a as a screen change effect, e.g., fading, pushing, or covering, in response to the arrivals of the multiple touches 880 and 881 at the positions 880c and 881c in the second touch screen 190b. The auditory feedback may be output as a sound in response to the arrivals of the multiple touches 880 and 881 at the positions 880c and 881c in the second touch screen 190b through the first speaker 163a or the second speaker 163b. The tactile feedback may be output as vibration in response to the arrivals of the multiple touches 880 and 881 at the positions 880c and 881c in the second touch screen 190b by the vibration motor 164.

Referring to FIG. 11B, a time, e.g., 1 sec, of providing the user with at least one feedback and the selection of the feedback, e.g., selection of at least one from the visual feedback, the auditory feedback, and the tactile feedback, may be changed using a feedback setting 1116 of the multiple-touch setting 1110.

In step S506 of FIG. 5, a second screen of the second touch screen is changed.

Referring to FIG. 8A, the controller 110 or the second control unit 110b change a second screen 850 to a third screen 820 in response to the arrivals of the multiple touches 880 and 881 at the positions 880c and 881c in the second touch screen 190b. The third screen 820 corresponds to the first screen 80. For example, the third screen 820 is a detailed screen of the friend 811 displayed in the friend list screen 810. The third screen 820 includes a name region 821 for displaying a photo of a friend and a message region 822 for displaying a time of receipt/transmission of a message from/to a friend and contents 823 of the received/transmitted message.

According to an embodiment of the present invention, the change from the second screen 850 to the third screen 820 is that both the first and second touch screens 190a and 190b are displayed with the screens 810 and 820 corresponding to a single application, i.e., the application originally on the first touch screen 190a. The change from the second screen 850 to the third screen 820 may be completed before the continuous movements of the multiple touches 880 and 881 are completed at the positions 880d and 881d.

Referring to FIG. 11B, the time of the change from the second screen 850 to the third screen 820 may be changed using a screen change time of the multiple-touch setting 1110.

Further, the controller 110 or the second control unit 110b change at least one of the first screen 800 of the first touch screen 190a and the second screen 850 of the second touch screen 190b in response to the arrival of at least one of the multiple touches 880 and 881 in the second touch screen 190b.

In step S507 of FIG. 5, the multiple touches in the second touch screen are detected.

More specifically, referring to FIG. 8B, the user inputs the multiple touches 882 and 883 in the third screen 820 of the second touch screen 190b. The controller 110 or the second control unit 110b detects the multiple touches 882 and 883 in the third screen 820 using the second touch screen 190b and the touch screen controllers 195 and 195b. Step S507 is identical to step S503. Accordingly, a repetitive description of step S507 will be omitted.

In step S508, the movements of the multiple touches in the second touch screen are detected.

More specifically, referring to FIG. 8B, the controller 110 or the second control unit 110b detects the continuous movements, e.g., the movements from the positions 882a and 883a to the positions 882b and 883b, of the multiple touches 882 and 883 contacting the third screen 820 of the second touch screen 190b using the second touch screen 190b and the touch screen controllers 195 and 195b. Step S508 is identical to step S504. Accordingly, a repetitive description of step S508 will be omitted.

In step S509, the apparatus 100 detects the arrivals of the multiple touches in the first touch screen 190b.

More specifically, referring to FIG. 8B, the multiple touches 882 and 883 pass through a space 110d from the second touch screen 190b to arrive in the first touch screen 190a. The controller 110, or the first control unit 110a and the second control unit 110b detect the continuous movements, e.g., the movements from initial positions 882a and 883a in the third screen 820 to last positions 882d and 883d in the first screen 800, of the multiple touches 882 and 883, using the first and second touch screens 190a and 190b and the touch screen controllers 195, 195a, and 195b. The controller 110, or the first control unit 110a and the second control unit 110b recognize the last positions 882b and 883b of the multiple touches 880 and 881 in the second touch screen 190b and the initial positions 882c and 883c of the arrivals of the multiple touches 880 and 881 in the first touch screen 190a using the touch screen controllers 195, 195a, and 195b.

Step S509 is identical to. Accordingly, a repetitive description of step S509 will be omitted.

Step S510 of FIG. 5 changes the third screen of the second touch screen.

Referring to FIG. 8B, the controller 110 or the second control unit 110b change the third screen 820 to the second screen 850 in response to the arrivals of the multiple touches 882 and 883 at the positions 882c and 883c in the first touch screen 190a.

Step S510 is identical to step S505. Accordingly, a repetitive description of step S510 will be omitted.

The changed second screen 850 is the photo screen 860 displayed in FIG. 8A.

Therefore, according to an embodiment of the present invention, the first screen 800 and the second screen 850 again correspond to different applications executed in the apparatus 100.

Figure 6:
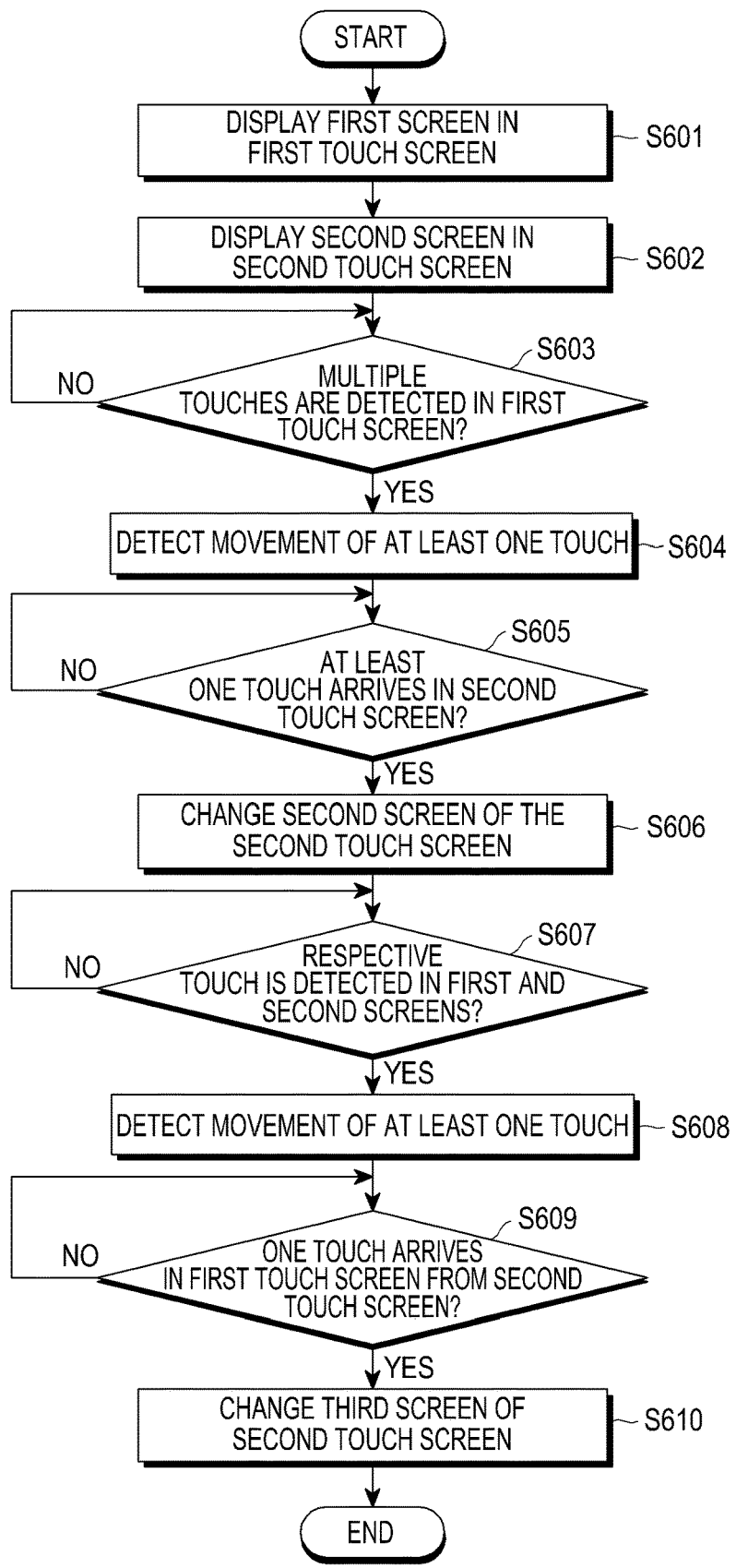
FIG. 6 is a flowchart illustrating a method of changing screens of an apparatus including multiple touch screens according to another embodiment of the present invention.

FIG. 6 is a flowchart illustrating a method of changing screens of an apparatus including multiple touch screens according to another embodiment of the present invention. Further, FIGS. 9A and 9B are screen images illustrating a method of changing screens of an apparatus including multiple touch screens according to another embodiment of the present invention Referring to FIG. 6, a first screen is displayed in the first touch screen in step S601.

Figure 9A:
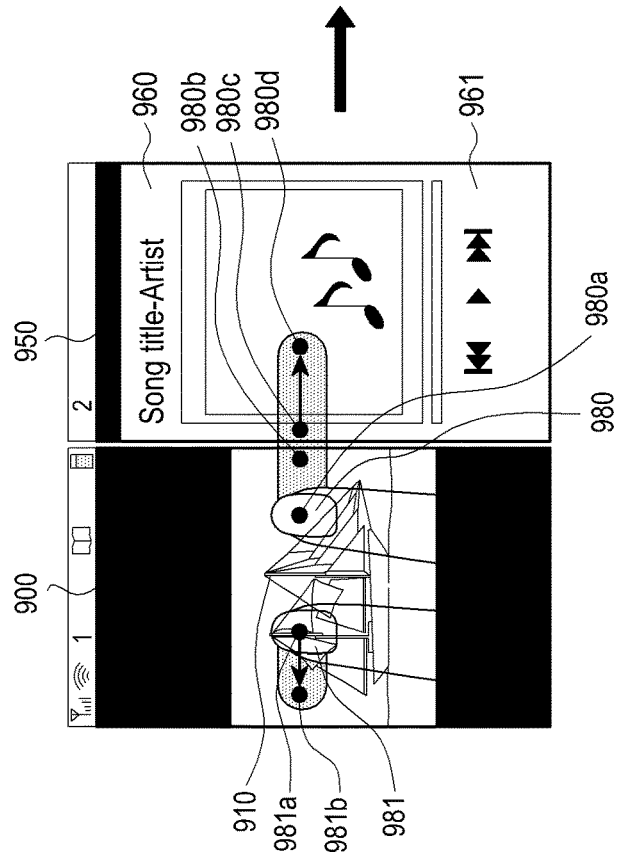
FIGS. 9A and 9B are screen images illustrating a method of changing screens of an apparatus including multiple touch screens according to another embodiment of the present invention.
Figure 9A:
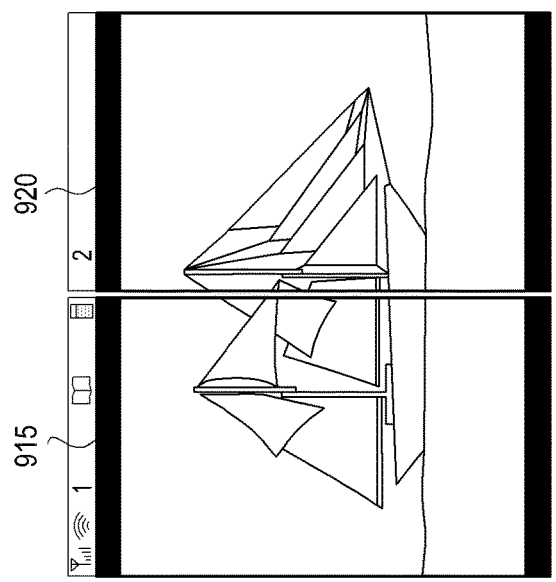
Figure 9B:
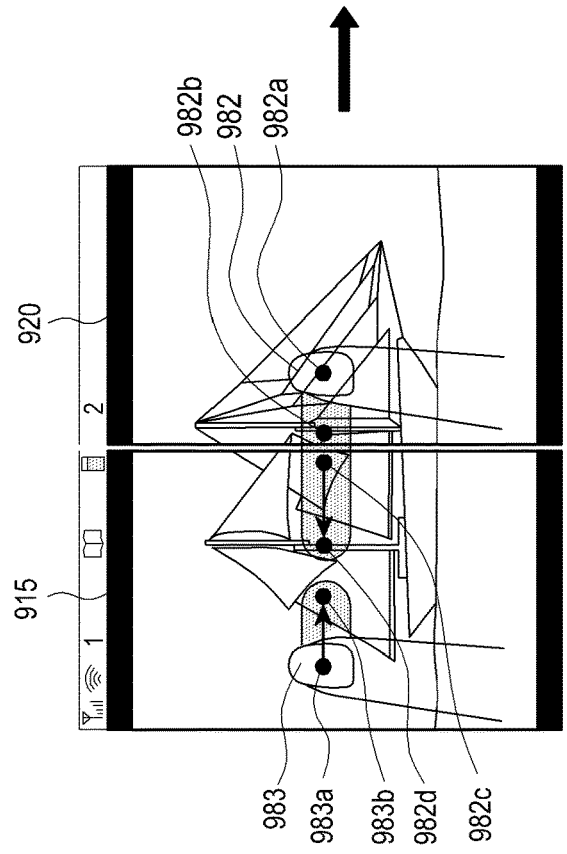
Figure 9B:
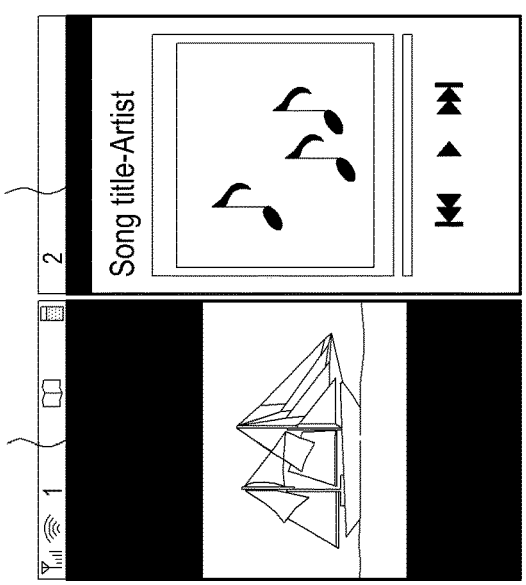

Referring to FIG. 9A, a first screen 900, i.e., a photograph, is displayed in the first touch screen 190a of the apparatus 100.

In step S602 of FIG. 6, a second screen is displayed in the second touch screen.

More specifically, referring to FIG. 9A, a music reproduction screen 960 including an operation button 961, e.g., play, stop, fast-forward, and rewind, for reproduction of the music is displayed on the second screen 950 on the second touch screen 190b of the apparatus 100.

According to an embodiment of the present invention, the first screen 900 and the second screen 950 correspond to different applications executed in the apparatus 100.

In step S603 of FIG. 6, multiple touches in the first touch screen are detected.

Referring to FIG. 9A, the user inputs the multiple touches 980 and 981 in the first touch screen 190a. The multiple touches 980 and 981 may be input by, for example, two fingers, one finger and a touching tool, or multiple touching tools.

The controller 110 or the control unit 110a detects the multiple touches 980 and 981 using the first touch screen 190 and the touch screen controllers 195 and 195a. The control units 110 and 110a may detect the multiple touches 980 and 981 based on a predetermined third time interval between a prior touch and a later touch, as described above.

The controller 110 or the control unit 110a receives the positions 882a and 883a, e.g., coordinates (x, y), on the first touch screen 190a corresponding to the multiple touches 982 and 983 from the touch screen controllers 195 and 195a. In FIG. 9A, the positions corresponding to the multiple touches 980 and 981 are in the photo screen 910 of the first screen 900.

In step S604 of FIG. 6, a movement of at least one touch in the first touch screen 190a is detected.

Referring to FIG. 9A, the controller 110 or the control unit 110a detects a continuous movement of at least one touch of the multiple touches 980 and 981 contacting the first touch screen 190a using the first touch screen 190a and the touch screen controllers 195 and 195a. The continuous movement of the at least one touch means that the one touch 980 between the multiple touches 980 and 981 moves in a direction of the second touch screen 190b, e.g., from the position 980a to the position 980b, and the other touch 981 may be fixed, e.g., fixed at the position 981a, or moves in an opposite direction of the second touch screen 190b, e.g., from the position 981a to the position 981b.

The continuous movement of at least one touch means that the contacts are continuously maintained on the first touch screen 190a and the second touch screen 190b, except for in the space 100d through which the one touch 980 passes. The continuous movement of the single touch is separated in the space 100d and the contact of the continuous movement of the single touch maintained from the initial position 980c on the second touch screen 190b is separated in the last position 980d.

Referring to FIG. 9A, the single touch 980 moves in the direction of the second touch screen 190b and the other touch 981 indicates a spreading gesture moving in an opposite direction of the second touch screen 190b. Further, the spreading gesture includes the one touch 980 moving in the direction of the second touch screen 190b and the other touch 981 fixed in the first touch screen 190a.

In step S605 of FIG. 6, an arrival of the at least one touch is detected in the second touch screen.

Referring to FIG. 9A, the one touch 980 begins in the first touch screen 190a and passes through the space 100d between the first touch screen 190a and the second touch screen 190b to arrive in the second touch screen 190b. The controller 110, or the first control unit 110a and the second control unit 110b detect the continuous movement, e.g., the movement from the initial position 980a to the last position 980d, of the one touch 980 by using the touch screen controllers 195, 195a, and 195b. The controller 110, or the first control unit 110a and the second control unit 110b may recognize the last position 980b of the one touch 980 in the first touch screen 190a and the initial position 980c of the one touch 980 arriving in the second touch screen 190b using the touch screen controllers 195, 195a, and 195b.

The controller 110, or the first control unit 110a and the second control unit 110b detects the arrival of the one touch 980 in the second touch screen 190b using a fourth time interval, e.g., a time for passing the space 100d, a determined area, or a direction, e.g., an allowable gradient range, as described above with reference to FIGS. 10A to 10C.

In step S606 of FIG. 6, the second screen in the second touch screen is changed.

More specifically, referring to FIG. 9A, the controller 110, or the first control unit 110a and the second control unit 110b change the second screen 950 to the third screen 920 in response to the arrival of the one touch 980 at the position 980c in the second touch screen 190b. The third screen 920 is a part of a screen corresponding to the first screen 910, for example, the third screen 920 is a part of the photo screen 910 of the first screen 900 enlarged to a full size screen including the first screen 900 and the second screen 950. The photo screen 910 is changed to an enlarged screen 915 in response to enlargement to a full screen size.

According to an embodiment of the present invention, the change to the third screen 920 means that the screens 915 and 920 correspond to a single application.

The change from the first screen 900 to the enlarged screen 915 may be started before the change from the second screen 950 to the third screen 920 is completed.

The controller 110, or the first control unit 110a and the second control unit 110b change at least one screen between the first screen 900 of the first touch screen 190a and the second screen 950 of the second touch screen 190b in response to the arrival of at least one of the multiple touches 980 and 981 in the second touch screen 190b.

In step S607 of FIG. 6, the apparatus 100 detects a respective touch in the first touch screen and the second touch screen.

More specifically, referring to FIG. 9B, the user inputs a touch 983 in the enlarged screen 915 of the first touch screen 190a and a touch 982 in the third screen 920 of the second touch screen 190b. The controller 110, or the first control unit 110a and the second control unit 110b may detect the respective touches 982 and 983 by using the first and second touch screens 190a and 190b and the touch screen controllers 195, 195a, and 195b. The controller 110, or the first control unit 110a and the second control unit 110b detect the respective touches 982 and 983 based on a fifth time interval between the times of a prior touch and a later touch set in the apparatus 100.

The controller 110, or the first control unit 110a and the second control unit 110b receive positions 982a and 983a, e.g., coordinates (x, y), in the first touch screen 190a and the second touch screen 190b corresponding to the respective touches 982 and 983 from the touch screen controllers 195, 195a, and 195b.

Referring to FIG. 9B, the positions 980a and 981a corresponding to the respective touches 982 and 983 are included in the enlarged screen 915 and the third screen 920.

In step S608 of FIG. 6, a movement of at least one touch in the first touch screen and the second touch screen is detected.

Referring to FIG. 9B, the controller 110, or the first control unit 110a and the second control unit 110b detect a continuous movement of at least one touch of the respective touches 982 and 983 contacting the first touch screen 190a and the second touch screen 190b using the first and second touch screen 190a and 190b and the touch screen controllers 190c, 190c1, and 190c2. The continuous movement of at least one touch means that the one touch 982 on the second touch screen 190b moves in the direction of the first touch screen 190a, e.g., the movement from the position 982a to the position 982b, and the other touch 983 on the first touch screen 190a is fixed, e.g., fixed at the position 983a, or the one touch 982 on the second touch screen 190b moves in the direction of the first touch screen 190a, e.g., the movement from the position 982a to the position 982b, and the other touch 983 on the first touch screen 190a moves in the direction of the second touch screen 190b, e.g., the movement from the position 983a to the position 983b. The continuous movement of at least one touch means that the contact is continuously maintained on the second touch screen 190b and the first touch screen 190a, except for the space 100d through which the one touch 982 passes.

Referring to FIG. 9B, the one touch 982 moving in the direction of the first touch screen 190a and the other touch 983 moving in the direction of the second touch screen 190b is a pinching gesture. The pinching gesture also includes the one touch 982 moving in the direction of the first touch screen 190a and the other touch 983 fixed in the second touch screen 190b.

In step S609 of FIG. 6, an arrival of the one touch in the first touch screen from the second touch screen is detected.

More specifically, referring to FIG. 9B, the one touch 982 is input in the second touch screen 190b and passes through the space 100d to arrive in the first touch screen 190a. The controller 110, or the first control unit 110a and the second control unit 110b detect the continuous movement, e.g., the movement from the initial position 982a to the last position 982b, of the one touch 982 between the multiple touches 982 and 983 using the touch screen controllers 195, 195a, and 195b. The controller 110, or the first control unit 110a and the second control unit 110b recognize the last position 982b of the one touch 982 in the second touch screen 190b and the initial position 982c of the arrival of the one touch 980 in the first touch screen 190 using the touch screen controllers 195, 195a, and 195b.

The controller 110, or the first control unit 110a and the second control unit 110b detect the arrival of the one touch 982 in the first touch screen 190a based on a sixth time interval, e.g., a time for passing the space 100d, a determined area, or a direction, e.g., an allowable gradient range, as described above with reference to FIGS. 10A to 10C.

In step S610 of FIG. 6, the third screen of the second touch screen is changed.

More specifically, referring to FIG. 9B, the controller 110, or the first control unit 110a and the second control unit 110b change the third screen 920 to the second screen 950 in response to the arrival of the one touch 982 at the position 980c in the first touch screen 190a. Further, the enlarged screen 915 is changed to the first screen 900.

Further, the controller 110, or the first control unit 110a and the second control unit 110b change at least one screen between the enlarged screen 915 in the first touch screen 190a and the third screen 920 in the second touch screen 190b in response to the arrival of at least one touch between the multiple touches 908 and 981 in the first touch screen 190a.

According to an embodiment of the present invention, the change from the third screen 920 to the second screen 950 displays the screens 900 and 950 again, corresponding to different applications, respectively.

Figure 7:
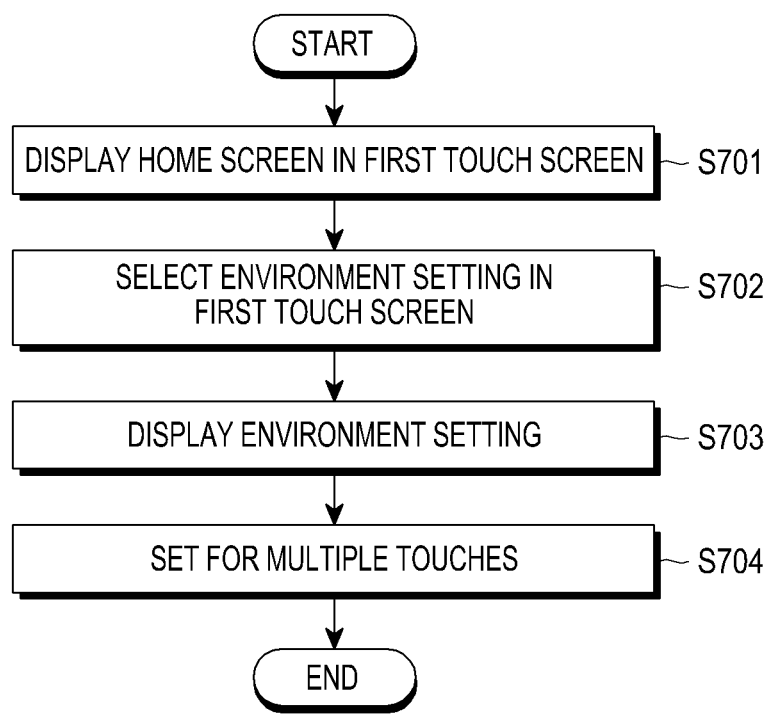
FIG. 7 is a flowchart illustrating a multiple-touch setting according to an embodiment of the present invention.

FIG. 7 is a flowchart illustrating a multiple-touch setting according to an embodiment of the present invention.

Referring to FIG. 7, in step S701, a home screen is displayed in the first touch screen or the second touch screen.

For example, referring to FIG. 1, when a user selects the home button 161a3 of the first button group 161a of the first housing 100a, a home screen is displayed in the first touch screen 190a. Similarly, when the user selects the home button 161b3 of the second button group 161b of the second housing 100b, a home screen is displayed in the second touch screen 190b.

In step S702 of FIG. 7, an environment setting is selected in the first touch screen, and in step S703, the environment setting is displayed.

FIG. 11A is a screen image illustrating an example of the multiple-touch setting according to an embodiment of the present invention.

Referring to FIG. 11A, the environment setting 1100 is displayed in the first touch screen 190a. The environment setting 1100 includes items of a wireless network 1101, communication 1102, sound 1103, display 1105, security 1105, and multiple-touch setting 1106. The item displayed in the environment setting may be added or deleted depending on the capability of the apparatus 100.

In step S704 of FIG. 7, the setting for the multiple touches is performed.

FIG. 11B is a screen image illustrating an example of the multiple-touch setting according to an embodiment of the present invention. Specifically, when the user selects the multiple-touch setting 1106 of FIG. 11A, the multiple-touch setting 1110 of FIG. 11B is displayed.

Referring to FIG. 11B, the multiple-touch setting 1110 includes an order 1111, the touch time interval 1112 between the multiple touches, the radius 113 of the determined area, the allowable gradient 1114 between the multiple touches, the touch gesture change 1115 corresponding to the screen change, and the feedback setting 1116. The setting for the multiple touches may be added or deleted depending on the capability supported by the apparatus 100.

Additionally, the above-described methods according to the embodiments of the present invention may be implemented in a form of a program instruction executable through various computer means and recorded in a non-transitory computer readable medium. The computer readable medium may include a program instruction, a data file, and a data structure or a combination thereof. The program instruction recorded in the computer readable medium may be specially designed and constructed for the present invention or be publicly known to and usable by the skilled person in a computer software field.

While the present invention has been shown and described with reference to certain embodiments and drawings thereof, it will be understood by those skilled in the art that various changes in form and details may be made therein without departing from the spirit and scope of the invention as defined by the appended claims and their equivalents.

What is claimed is:

1. A method performed by an electronic device comprising a first touch display mounted to a first housing, a second touch display mounted to a second housing, and a hinge connecting the first housing and the second housing, the method comprising:
    displaying a first screen that displays content of a first application on an entire area of ft the first touch display of the electronic device, in an unfolding state of the electronic device in which the first housing and the second housing are arranged such that the first touch display and the second touch display face a same direction;
    displaying a second screen of a second application different from the first application on an entire area of the second touch display of the electronic device, in the unfolding state;
    detecting a plurality of touch inputs continuously moving from the first touch display to the second touch display across the first touch display and the second touch display, in the unfolding state; and
    based on detecting the plurality of touch inputs continuously moving from the first touch display to the second touch display across the first touch display and the second touch display, displaying a third screen that displays different content of the first application on the entire area of the second touch display such that the second screen of the second application is not displayed in the second touch display, in the unfolding state,
    wherein the third screen is not a screen in which the first screen is enlarged.

2. The method of claim 1, wherein the plurality of touch inputs continuously moving include one of a drag and drop gesture and a flick gesture.

3. The method of claim 1, wherein the plurality of touch inputs continuously moving begin in the first touch display, pass through a space formed between the first touch display and the second touch display, and arrive in the second touch display.

4. The method of claim 3, further comprising at least one of the first touch display and the second touch display providing feedback in response to the plurality of touch inputs in the second touch display.

5. The method of claim 4, wherein the feedback includes at least one of visual feedback, auditory feedback, and tactile feedback.

6. The method of claim 3, wherein detecting the plurality of touch inputs continuously moving utilizes times, areas, or directions in which the plurality of touch inputs is detected in the second touch display.

7. The method of claim 1, further comprising:
    detecting the plurality of touch inputs continuously moving from the second touch display to the first touch display; and based on detecting the plurality of touch inputs continuously moving from the second touch display to the first, displaying the first application in the first touch display and displaying the second application in the second touch display.

8. The method of claim 1, further comprising rotating at least one of the first touch display and the second touch display about the hinge.

9. An apparatus, comprising:
a first housing;
a second housing;
a first touch display mounted on the first housing;
a second touch display mounted on the second housing; and
a control unit configured to:
  display, on an entire area of the first touch display, a first screen that displays content of a first application, in an unfolding state of the apparatus in which the first housing and the second housing are arranged such that the first touch display and the second touch display face a same direction,
  display, on an entire area of the second touch display, a second screen of a second application different from the first application, in the unfolding state,
  detect a plurality of touch inputs continuously moving from the first touch display to the second touch display across the first touch display and the second touch display, in the unfolding state, and
  based on detecting the plurality of touch inputs continuously moving from the first touch display to the second touch display across the first touch display and the second touch display, display a third screen that displays different content of the first application on the entire area of the second touch display such that the second application is not displayed on the second touch display, in the unfolding state,
  wherein the third screen is not a screen in which the first screen is enlarged.

10. The apparatus of claim 9, wherein the plurality of touch inputs comprises one of:
a drag and drop gesture; and
a flick gesture.

11. The apparatus of claim 9, wherein the control unit detects arrivals of the plurality of touch inputs in the second touch display using times, areas, or directions in which the plurality of touch inputs are detected.

12. The apparatus of claim 9, wherein the apparatus further comprises:
a hinge connecting the first touch display and the second touch display.

13. The apparatus of claim 12, wherein the first touch display and the second touch display connected by the hinge are configured to be rotated about the hinge.

* * * * *